(12) United States Patent
    Seo

(10) Patent No.: US 11,019,631 B2
(45) Date of Patent: *May 25, 2021

(54) METHOD AND APPARATUS FOR TERMINAL TO TRANSMIT AND RECEIVE SIGNAL USING SIDELINKS BETWEEN DEVICES

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,358

(22) Filed: Oct. 2, 2019

(65) Prior Publication Data

US 2020/0037306 A1    Jan. 30, 2020

Related U.S. Application Data

(63) Continuation of application No. 15/533,343, filed as application No. PCT/KR2015/013309 on Dec. 7, 2015, now Pat. No. 10,455,587.

(Continued)

(51) Int. Cl.
    *H04W 72/04* (2009.01)
    *H04W 76/14* (2018.01)
    (Continued)

(52) U.S. Cl.
    CPC ......... *H04W 72/048* (2013.01); *H04W 52/36* (2013.01); *H04W 72/02* (2013.01);
    (Continued)

(58) Field of Classification Search
    CPC . H04W 76/14; H04W 72/0446; H04W 72/02; H04W 72/10
    See application file for complete search history.

(56) References Cited

U.S. PATENT DOCUMENTS 10,455,587 B2  10/2019 Seo
2013/0103292 A1  4/2013 Yuse et al.
(Continued)

FOREIGN PATENT DOCUMENTS

| CN | 201410452739 | * | 9/2015 |
| JP | WO2014017477 | | 7/2016 |
| WO | 2013191360 | | 12/2013 |

OTHER PUBLICATIONS

Author Unknown, Remaining issues on overlap of SA/D2D Data transmissions, Doc No. R1-144724, pp. 1-2, Nov. 21, 2014 (Year: 2014).*

(Continued)

*Primary Examiner* — Christopher M Crutchfield
(74) *Attorney, Agent, or Firm* — Lee Hong Degerman Kang Waimey

(57) ABSTRACT

Disclosed is a method for a terminal to transmit and receive a signal in a wireless communication system using sidelinks. Specifically, the method comprises the steps of: determining a first transmission resource for transmitting a first sidelink signal; and determining a second transmission resource for transmitting an uplink signal, wherein if the first transmission resource and the second transmission resource overlap in a time domain, the first sidelink signal is transmitted with a priority over the uplink signal.

4 Claims, 18 Drawing Sheets

Related U.S. Application Data

(60) Provisional application No. 62/087,811, filed on Dec. 5, 2014, provisional application No. 62/193,600, filed on Jul. 17, 2015, provisional application No. 62/216,340, filed on Sep. 9, 2015.

(51) Int. Cl.
  *H04W 72/02* (2009.01)
  *H04W 52/36* (2009.01)
  *H04W 72/10* (2009.01)
  *H04W 4/90* (2018.01)

(52) U.S. Cl.
  CPC ....... *H04W 72/0446* (2013.01); *H04W 72/10* (2013.01); *H04W 76/14* (2018.02); *H04W 4/90* (2018.02); *H04W 72/0453* (2013.01)

(56) References Cited

U.S. PATENT DOCUMENTS

| | | | |
|---|---|---|---|
| 2013/0178221 A1* | 7/2013 | Jung | H04W 52/281 455/450 |
| 2013/0215811 A1* | 8/2013 | Takaoka | H04W 28/0268 370/311 |
| 2014/0003262 A1 | 1/2014 | He et al. | |
| 2015/0043446 A1* | 2/2015 | Tsirtsis | H04W 72/1242 370/329 |
| 2015/0208440 A1* | 7/2015 | Agiwal | H04W 74/085 370/329 |
| 2015/0215903 A1 | 7/2015 | Zhao et al. | |
| 2016/0044737 A1* | 2/2016 | Kwon | H04W 76/14 370/328 |
| 2016/0088643 A1 | 3/2016 | Guo | |
| 2016/0142898 A1 | 5/2016 | Poitau et al. | |
| 2016/0150520 A1 | 5/2016 | Fodor et al. | |
| 2016/0255638 A1* | 9/2016 | Martin | H04L 5/0053 370/329 |
| 2016/0323870 A1* | 11/2016 | Wei | H04W 72/048 |
| 2016/0338016 A1* | 11/2016 | Matsumoto | H04W 8/005 |
| 2017/0142741 A1* | 5/2017 | Kaur | H04W 72/02 |
| 2017/0367087 A1 | 12/2017 | Seo | |
| 2018/0069618 A1* | 3/2018 | Loehr | H04W 72/1263 |
| 2018/0176871 A1* | 6/2018 | Li | H04W 52/367 |

OTHER PUBLICATIONS

Author Unknown, Remaining issues on Mode-1 D2D Communication, Doc No. R1-144927, p. 1, Nov. 21, 2014 (Year: 2014).*
PCT International Application No. PCT/KR2015/013309, Written Opinion of the International Searching Authority dated Mar. 23, 2016, 22 pages.
LG Electronics, "Issues on multiplexing of WAN and D2D", 3GPP TSG RAN WG1 Meeting #76bis, R1-141354, Apr. 2014, 10 pages.
Samsung, "WAN and D2D priority handling for type-1 discovery", 3GPP TSG RAN WG1 Meeting #77, R1-142110, May 2014, 3 pages.
Huawei, "Transmission and reception in the D2DSS/PD2DSCH overlapped resource", 3GPP TSG RAN WG1 Meeting #79, R1-144570, Nov. 2014, 5 pages.
U.S. Appl. No. 15/533,343, Final Office Action dated Feb. 21, 2019, 34 pages.
U.S. Appl. No. 15/533,343, Office Action dated Jun. 28, 2018, 35 pages.
LG Electronics, "Multiplexing of Uu and D2D communication", 3GPP TSG RAN WG1 Meeting #76, R1-140335, Feb. 2014, 7 pages.

* cited by examiner

FIG. 10
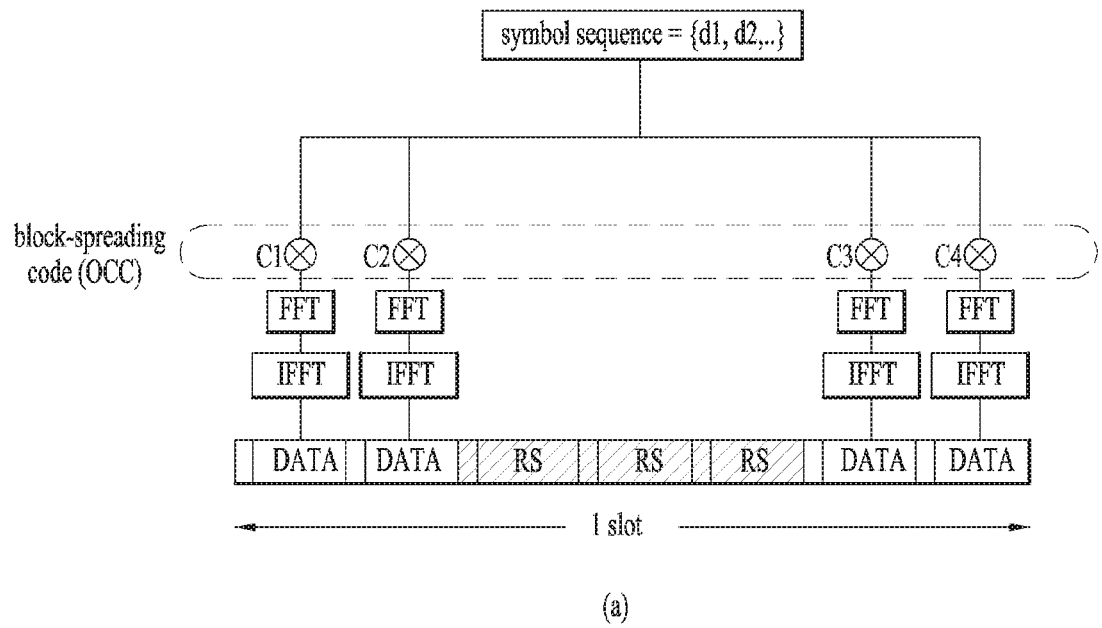
(a)
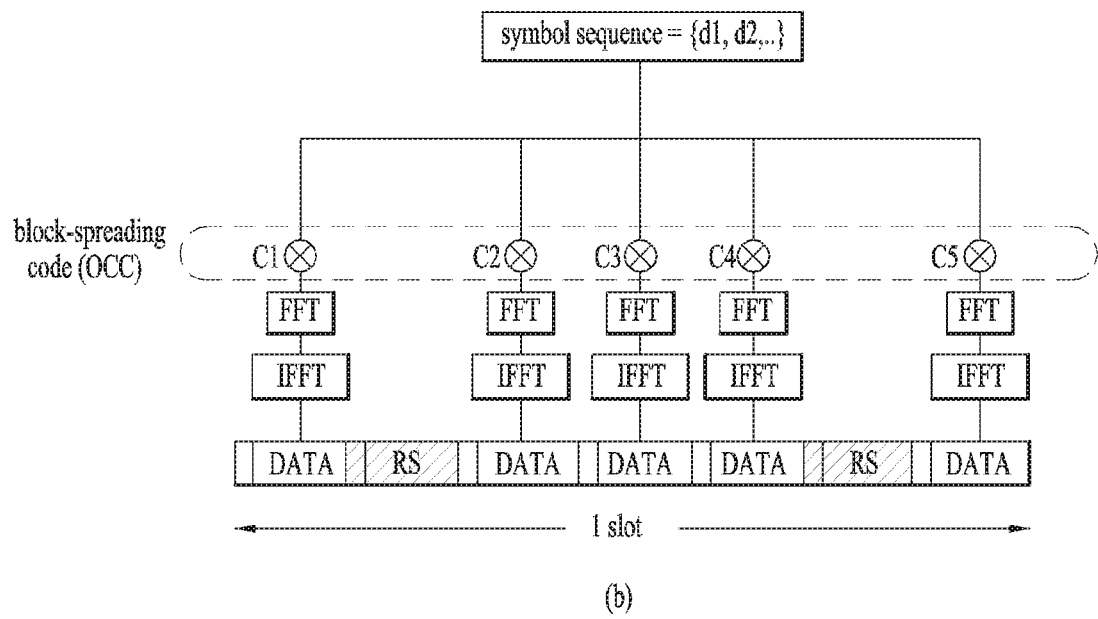
(b)

METHOD AND APPARATUS FOR TERMINAL TO TRANSMIT AND RECEIVE SIGNAL USING SIDELINKS BETWEEN DEVICES

CROSS-REFERENCE TO RELATED APPLICATIONS

This application is a continuation of U.S. patent application Ser. No. 15/533,343, filed on Jun. 5, 2017, U.S. Pat. No. 10,455,587, which is the National Stage filing under 35 U.S.C. 371 of International Application No. PCT/KR2015/013309, filed on Dec. 7, 2015, which claims the benefit U.S. Provisional Application No. 62/087,811, filed on Dec. 5, 2014, 62/193,600, filed on Jul. 17, 2015 and 62/216,340, filed on Sep. 9, 2015, the contents of which are all hereby incorporated by reference herein in their entirety.

TECHNICAL FIELD

The present disclosure relates to a wireless access system supporting Device-to-Device (D2D) communication, and more particularly, to a method and apparatus for transmitting and receiving signals via a sidelink by a User Equipment (UE).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An aspect of the present disclosure is to provide a method for efficiently transmitting and receiving signals via a sidelink by a User Equipment (UE) in a wireless access system supporting Device-to-Device (D2D) communication.

Another aspect of the present disclosure is to provide a method for configuring resources to efficiently transmit and receive signals via a sidelink.

Particularly, another aspect of the present disclosure is to provide various methods and apparatuses for efficiently transmitting and receiving signals via a sidelink, upon occurrence of an emergency.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure, which relates to a wireless communication system, provides a method for transmitting and receiving signals via a sidelink, and apparatuses supporting the method.

In an aspect of the present disclosure, a method for transmitting a signal via a sidelink by a User Equipment (UE) in a wireless communication system may include determining a first transmission resource for transmission of a first sidelink signal, and determining a second transmission resource for transmission of an uplink signal. If the first transmission resource overlaps with the second transmission resource in a time area, the first sidelink signal may be transmitted with priority over the uplink signal.

In another aspect of the present disclosure, a method for receiving a signal via a sidelink by a UE in a wireless communication system may include determining a first transmission resource for reception of a first sidelink signal, and determining a second transmission resource for reception of an uplink signal. If the first transmission resource overlaps with the second transmission resource in a time area, the first sidelink signal may be received with priority over the uplink signal.

In another aspect of the present disclosure, a UE for transmitting a signal via a sidelink in a wireless communication system may include a transceiver for transmitting and receiving sidelink signals, and a processor for determining a first transmission resource for transmission of a first sidelink signal, and determining a second transmission resource for transmission of an uplink signal. If the first transmission resource overlaps with the second transmission resource in a time area, the first sidelink signal may be transmitted with priority over the uplink signal.

In another aspect of the present disclosure, a UE for receiving a signal via a sidelink in a wireless communication system may include a transceiver for transmitting and receiving sidelink signals, and a processor for determining a first reception resource for transmission of a first sidelink signal, and determining a second reception resource for transmission of an uplink signal. If the first transmission resource overlaps with the second transmission resource in a time area, the first sidelink signal may be received with priority over the uplink signal.

In the aspects of the present disclosure, the following may be commonly applied.

If the first transmission resource and the second transmission resource are identical in a frequency area, only the first sidelink signal may be transmitted.

If the first transmission resource and the second transmission resource are different in a frequency area, only the first sidelink signal may be transmitted in the first transmission resource in the overlapped time area.

The first sidelink signal may be triggered aperiodically by a predetermined event.

The first sidelink signal may be transmitted periodically.

The priority may be valid within a preset time period.

In this case, the uplink signal may be transmitted with priority over the first sidelink signal at a time outside the time period.

According to the present disclosure, a third transmission resource for transmission of a second sidelink signal may be determined. In this case, if the first transmission resource overlaps with the third transmission resource in a time area, the first sidelink signal may be transmitted with priority over the second sidelink signal.

The second sidelink signal may be transmitted on one of a sidelink discovery channel, a sidelink control channel, and a sidelink data channel.

Upon generation of the first sidelink signal, an indicator indicating transmission of the first sidelink signal may be transmitted to a serving cell.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings. That is, those skilled in the art will also achieve unintended effects of implementation of the present disclosure from the embodiments of the present disclosure.

Advantageous Effects

According to the embodiments of the present disclosure, a User Equipment (UE) may efficiently transmit and receive signals via a sidelink in a wireless access system supporting Device-to-Device (D2D) communication. Further, according to the embodiments of the present disclosure, resources may be configured in such a manner that a UE may efficiently transmit and receive signals via a sidelink. Particularly, upon occurrence of an emergency, signals may be efficiently transmitted and received via a sidelink.

BRIEF DESCRIPTION OF THE DRAWINGS

The accompanying drawings, which are included to provide a further understanding of the disclosure, illustrate embodiments of the disclosure and together with the description serve to explain the principle of the disclosure. In the drawings:

FIG. 10 is a view illustrating a PUCCH structure using block spreading;

BEST MODE FOR CARRYING OUT THE INVENTION

Figure 1:
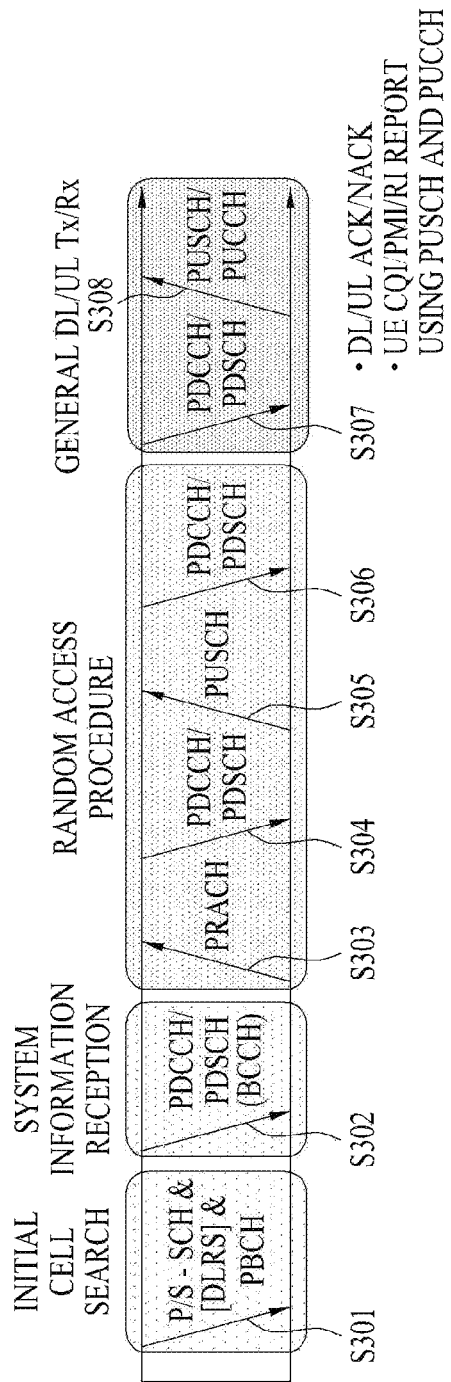
FIG. 1 is a view illustrating physical channels and a signal transmission method using the physical channels.

Embodiments of the present disclosure as described below in detail relate to a wireless access system supporting an unlicensed band, and provide a method for configuring a Transmission Opportunity Period (TxOP) and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, $3^{rd}$ Generation Partnership Project (3GPP) Long Term Evolution/Long Term Evolution-Advanced (LTE/LTE-A) systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
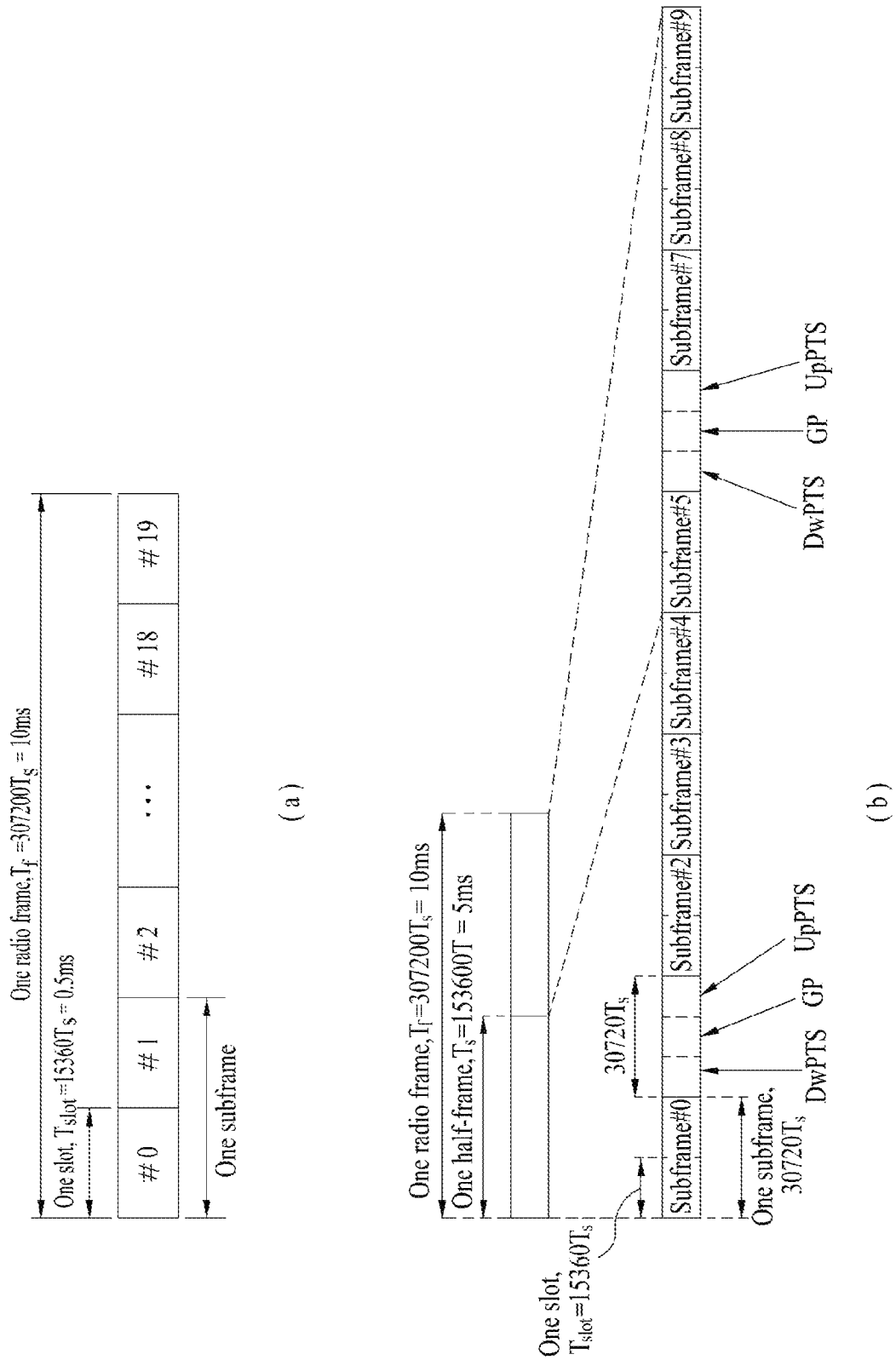
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
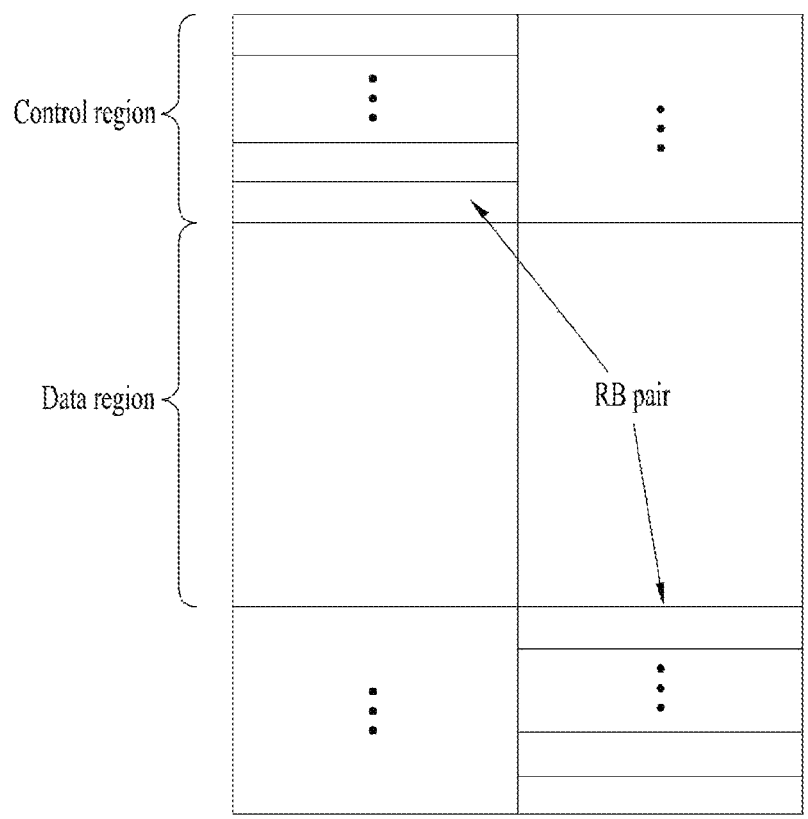
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
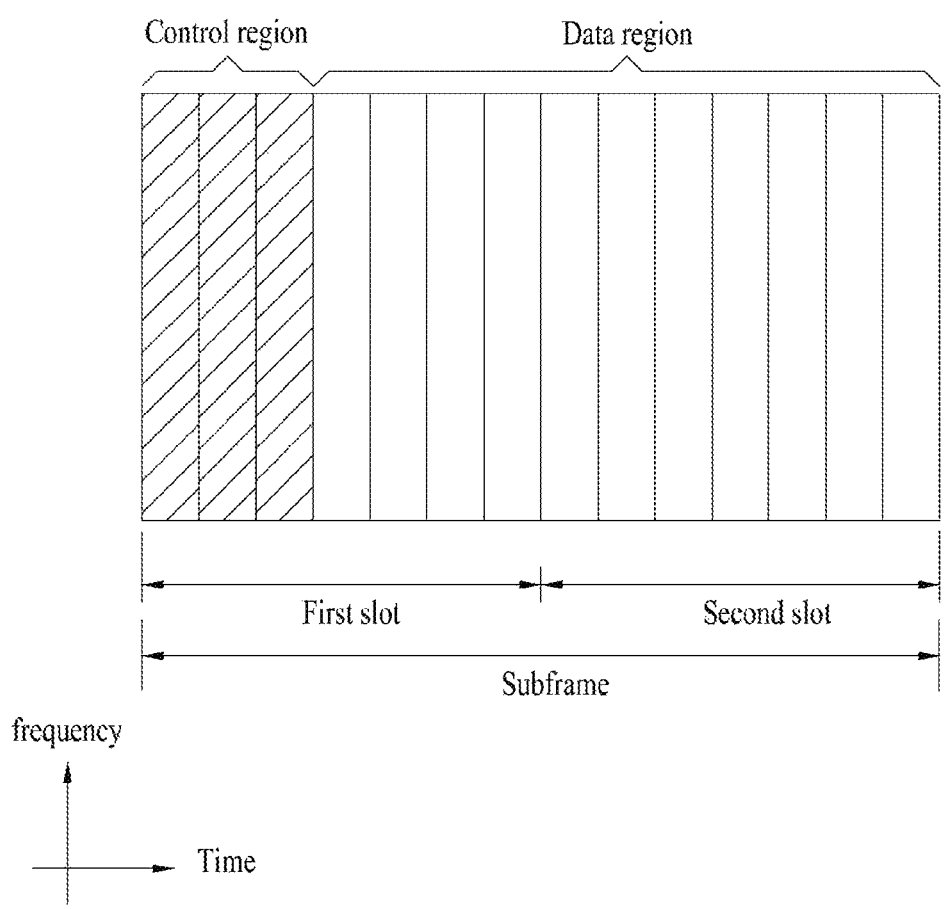
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Synchronization Signal

When a UE is powered on or intends to access a new cell, the UE performs an initial cell search procedure in which it

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
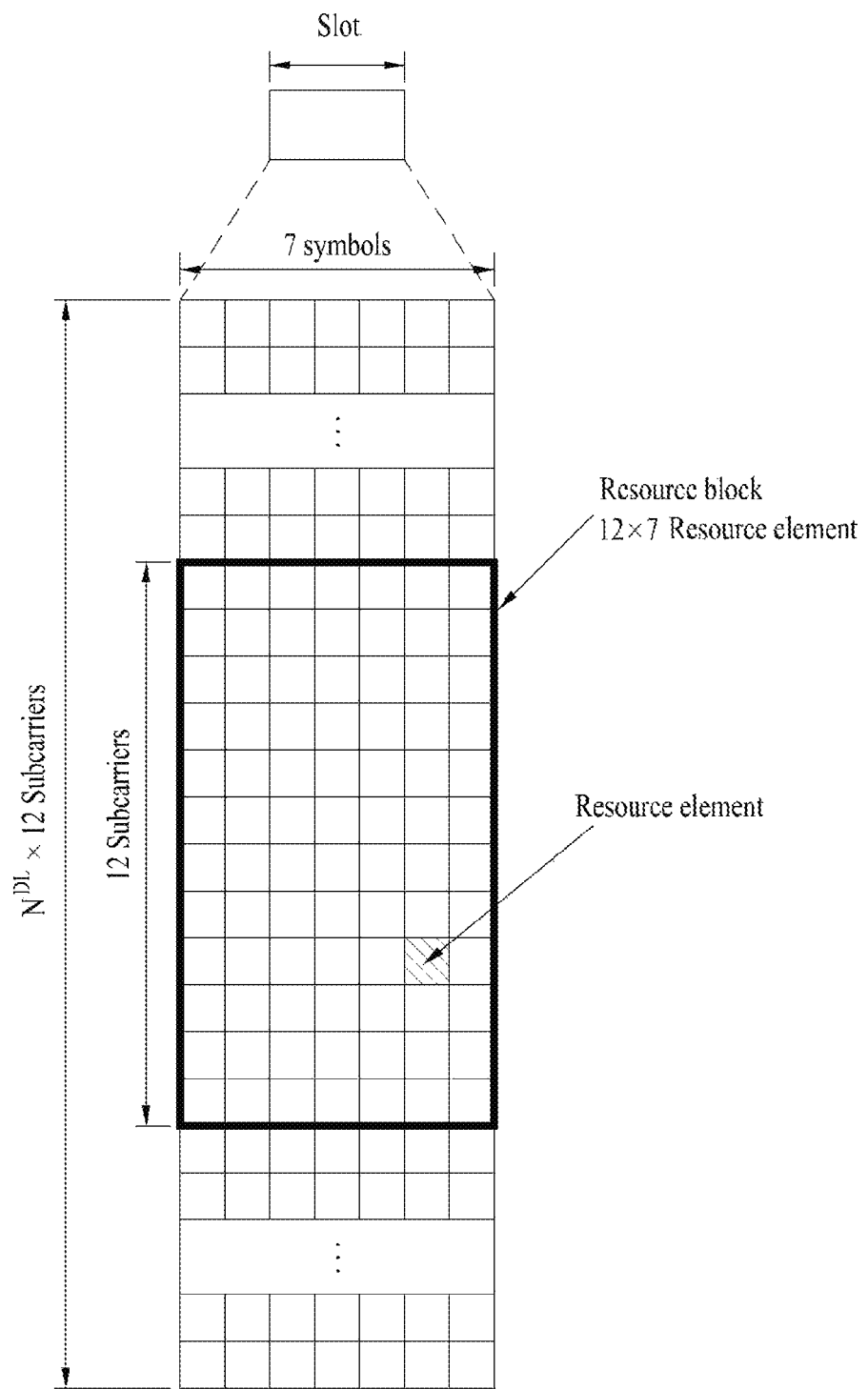
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 acquires time synchronization and frequency synchronization with a cell, and detects the physical layer cell Identifier (ID) of the cell, NCellID. For this purpose, the UE may be synchronized with an eNB and acquire information such as a cell ID by receiving, from the eNB, synchronization signals, for example, a Primary Synchronization Signal (PSS) and a Secondary Synchronization Signal (SSS) on a Primary Synchronization Channel (P-SCH) and a Secondary Synchronization Channel (S-SCH).

Specifically, to acquire time-domain synchronization such as OFDM symbol synchronization and slot synchronization, and/or frequency-domain synchronization by means of the PSS, a Zadoff-Chu (ZC) sequence of length 63 is defined in the frequency domain and used as $^{PSS}d(n)$ according to [Equation 1].

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In [Equation 1], u represents the index of a ZC root sequence. The current LTE system defines u as listed in [Table 2].

TABLE 2

| $N_{ID}^{(2)}$ | Root index μ |
|---|---|
| 0 | 25 |
| 1 | 29 |
| 2 | 34 |

The SSS is used to acquire frame synchronization, a cell group ID, and/or a Cyclic Prefix (CP) configuration of the cell (i.e., information indicating whether a normal CP or an extended CP is used). An SSS sequence of length 62, d(0), . . . , d(61) is configured by interleaving two binary sequences each having length 31. As illustrated in [Equation 2], a different SSS sequence is defined depending on whether it is transmitted in subframe #0 or subframe #5. In [Equation 2], n is 0 or an integer greater than 0 and equal to or less than 30.

$$d(2n) = \begin{cases} s_0^{(m_0)}(n)c_0(n) & \text{in subframe } 0 \\ s_1^{(m_1)}(n)c_0(n) & \text{in subframe } 5 \end{cases} \quad \text{[Equation 2]}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

More specifically, the synchronization signals are transmitted in the first slot of subframe #0 and the first slot of subframe #5 in consideration of the length of a GSM frame, 4.6 ms in order to facilitate inter-Radio Access Technology (inter-RAT) measurement. Particularly, the PSS is transmitted in the last OFDM symbol of the first slot of subframe #0 and the last OFDM symbol of the first slot of subframe #5, whereas the SSS is transmitted in the second last OFDM symbol of the first slot of subframe #0 and the second last OFDM symbol of the first slot of subframe #5. The boundary of a corresponding radio frame may be detected by the SSS. The PSS is transmitted in the last OFDM symbol of a corresponding slot, and the SSS is transmitted in the OFDM symbol previous to the PSS.

504 unique physical layer cell IDs may be produced by combining 3 PSSs with 168 SSs. In other words, the physical layer cell IDs are grouped into 168 physical layer cell ID groups each including 3 unique IDs, so that each physical layer cell ID may become a part of only one physical cell ID group. Accordingly, a physical layer cell ID, $N^{cell}_{ID}$ is uniquely defined by the index of a physical layer cell ID group, $N^{(1)}_{ID}$ ranging from 0 to 167 and a physical layer ID, $N^{(2)}_{ID}$ in the physical layer cell ID group, ranging from 0 to 2. The UE may determine one of 3 unique physical layer IDs by detecting the PSS, and identify one of 168 physical layer cell IDs associated with the physical layer ID.

Since the PSS is transmitted every 5 ms, the UE may determine that a corresponding subframe is one of subframe #0 and subframe #5 by detecting the PSS. However, the UE has no way to determine whether the subframe is subframe #0 or subframe #5. Therefore, the UE may not identify the boundary of a radio frame only with the PSS. In other words, the UE may not acquire frame synchronization only with the PSS. The UE detects the boundary of the radio frame by detecting the SSS which is transmitted twice as different sequences in one radio frame.

In this manner, the UE may be synchronized with the eNB and acquire information such as a cell ID by receiving the PSS and the SSS from the eNB, for cell search/research. Subsequently, the UE may receive broadcasting information on a PBCH within the cell managed by the eNB.

1.3 Physical Downlink Control Channel (PDCCH)

1.3.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.3.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 3] below illustrates PDCCH formats. 4 PDCCH formats are supported according to CCE aggregation levels as illustrated in [Table 3].

TABLE 3

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 4] lists DCI according to DCI formats.

TABLE 4

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 4], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.3.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.3.4 Blind Decoding (BD)

A plurality of PDCCHs may be transmitted in a subframe. That is, the control region of a subframe includes a plurality of CCEs, CCE 0 to CCE $N_{CCE,k-1}$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 5] illustrates the sizes of CSSs and USSs.

TABLE 5

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 3]}$$

Herein, $M^{(L)}$ is the number of PDCCH candidates with CCE aggregation level L to be monitored in the SS, m=0, . . . , $M^{(L)}$−1, i is the index of a CCE in each PDCCH candidate, and i=0, . . . , L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 6

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 3], for two aggregation levels, L=4 and L=8, $Y_k$ is set to 0 in the CSS, whereas $Y_k$ is defined by [Equation 4] for aggregation level L in the USS.

$$Y_k=(A \cdot Y_{k-1}) \bmod D \qquad \text{[Equation 4]}$$

Herein, $Y_{-1}=n_{RNTI}\neq 0$, $n_{RNTI}$ indicating an RNTI value. A=39827 and D=65537.

1.4 PUCCH (Physical Uplink Control Channel)

1.4.1 PUCCH Overview

Uplink control information transmitted on PUCCH may include SR (Scheduling Request), HARQ ACK/NACK information, and DL channel measurement information.

The HARQ ACK/NACK information can be generated according to whether a decoding of a DL data packet on PDSCH is succeeded. In a legacy wireless communication system, 1 bit as the ACK/NACK information is transmitted for a DL single codeword transmission and 2 bits as the ACK/NACK information are transmitted for DL 2 codeword transmission.

The channel measurement information indicates feedback information related to a MIMO (Multiple Input Multiple Output) scheme and can include a channel quality indicator (CQI), a precoding matrix index (PMI), and a rank indicator (RI). The aforementioned channel measurement information may be commonly called a CQI. 20 bits per subframe can be used to transmit the CQI.

PUCCH can be modulated using BPSK (binary phase shift keying) and QPSK (quadrature phase shift keying) scheme. Control information of a plurality of UEs can be transmitted on the PUCCH. In case of performing code division multiplexing (CDM) to distinguish a signal of each of the UEs, constant amplitude zero autocorrelation (CA-ZAC) sequence of length 12 is mainly used. Since the CAZAC sequence has a characteristic of maintaining constant amplitude in time domain and frequency domain, the CAZAC sequence has an appropriate property to increase coverage in a manner of lowering peak-to-average power ratio (PARR) or cubic metric (CM) of a UE. And, the ACK/NACK information on a DL data transmission transmitted on the PUCCH is covered using an orthogonal sequence or an orthogonal cover (OC).

And, the control information transmitted on the PUCCH can be distinguished using a cyclically shifted sequence including a cyclic shift (CS) value different from each other. The cyclically shifted sequence can be generated in a manner that a base sequence is cyclically shifted as much as a specific cyclic shift (CS) amount. The specific CS amount is indicated by a CS index. The number of available cyclic shift may vary according to a delay spread of a channel. Various types of sequences can be used as the base sequence and the aforementioned CAZAC sequence corresponds to one example of the base sequence.

And, the amount of control information capable of being transmitted by a UE in a subframe can be determined according to the number (i.e., SC-FDMA symbols except an SC-FDMA symbol used for transmitting a reference signal (RS) to detect coherent of the PUCCH) of SC-FDMA symbol available to transmit the control information.

PUCCH format 1 is used to solely transmit an SR. In case of solely transmitting the SR, a wave, which is not modulated, is applied. This shall be described in detail later.

PUCCH format 1a or 1b is used to transmit HARQ ACK/NACK. In case of solely transmitting the HARQ ACK/NACK in a random subframe, the PUCCH format 1a or 1b can be used. Or, the HARQ ACK/NACK and the SR may be transmitted in an identical subframe using the PUCCH format 1a or 1b.

PUCCH format 2 is used to transmit a CQI and PUCCH format 2a or 2b is used to transmit the CQI and the HARQ ACK/NACK. In case of an extended CP, the PUCCH format 2 may be used to transmit the CQI and the HARQ ACK/NACK.

Figure 6:
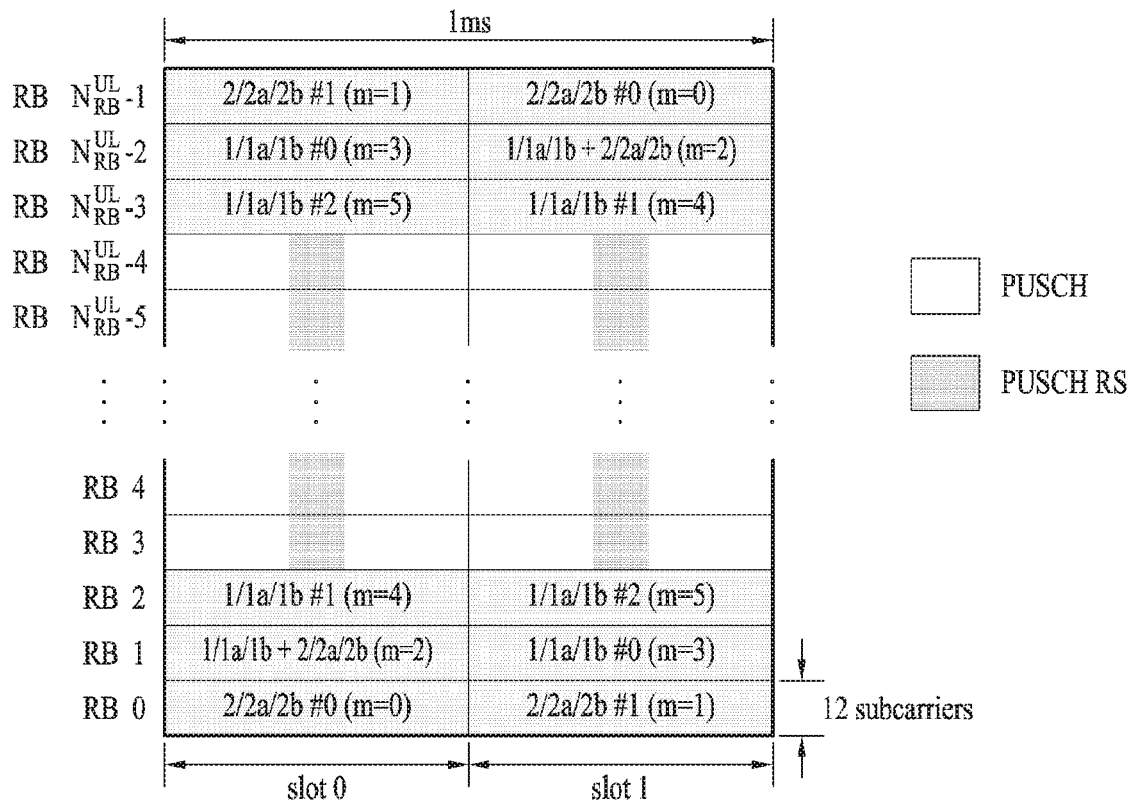
FIG. 6 is a view illustrating mapping between Physical Uplink Control Channel (PUCCH) formats and uplink Physical Resource Blocks (PRBs)

FIG. 6 is a view illustrating mapping between PUCCH formats and uplink Physical Resource Blocks (PRBs). Referring to FIG. 5, $$N_{RB}^{UL}$$

indicates the number of resource blocks in UL and 0, 1, . . .

$$N_{RB}^{UL}-1$$

means numbers of the physical resource block. Basically, PUCCH is mapped to both edges of a UL frequency block. As depicted in FIG. 5, PUCCH format 2/2a/2b are mapped to the PUCCH region displayed as m=0, 1. This may represent that the PUCCH format 2/2a/2b are mapped to resource blocks situated at a band-edge. And, the PUCCH format 2/2a/2b and PUCCH format 1/1a/1b can be mapped to a PUCCH region displayed as m=2 in a manner of being mixed. The PUCCH format 1/1a/1b can be mapped to a PUCCH region displayed as m=3, 4, 5. The number $$(N_{RB}^{(2)})$$

of PUCCH RBs usable by the PUCCH format 2/2a/2b can be directed to UEs in a cell by a broadcasting signaling.

1.4.2. PUCCH Resources

A BS assigns a PUCCH resource for transmitting UCI to a UE by an explicit scheme via a higher layer signaling or an implicit scheme.

In case of ACK/NACK, a plurality of PUCCH resource candidates can be configured to a UE by a higher layer and which PUCCH resource is used among a plurality of the PUCCH resource candidates can be determined by the implicit scheme. For instance, the UE receives PDSCH from the BS and the ACK/NACK for a corresponding data unit can be transmitted via the PUCCH resource implicitly determined by PDCCH resource carrying scheduling information on the PDSCH.

Figure 7:
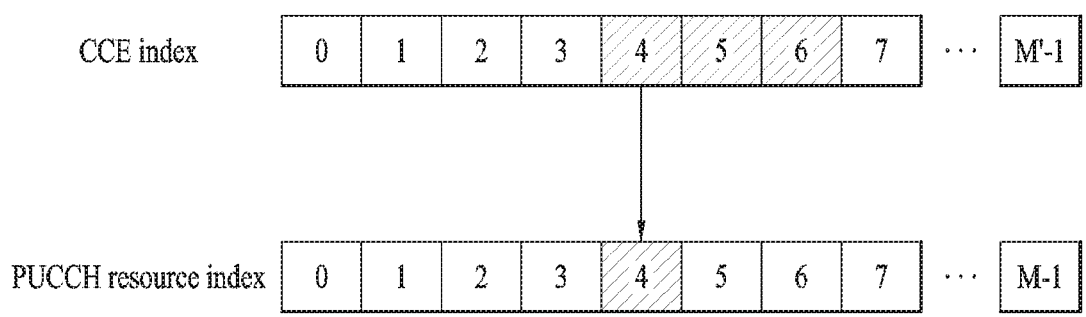
FIG. 7 is a view illustrating exemplary determination of PUCCH resource for an Acknowledgement/Negative Acknowledgment (ACK/NACK)

FIG. 7 is a view illustrating exemplary determination of PUCCH resource for an Acknowledgement/Negative Acknowledgment (ACK/NACK).

In the LTE system, a PUCCH resource for an ACK/NACK is not assigned to each UE in advance. Instead, a plurality of UEs in a cell uses a plurality of PUCCH resources on every timing point in a manner of dividing a plurality of the PUCCH resources. Specifically, the PUCCH resource used for transmitting the ACK/NACK by the UE is determined by an implicit scheme based on the PDCCH carrying scheduling information on PDSCH, which carries a corresponding DL data. A whole region to which the PDCCH is transmitted in each DL subframe consists of a plurality of Control Channel Elements (CCE). And, the PDCCH transmitted to the UE consists of one or more CCEs. The CCE includes a plurality of Resource Element Groups (REGs). One REG consists of 4 adjacent Resource Elements (REs) except Reference Signals (RSs). The UE transmits the ACK/NACK via an implicit resource derived or calculated by a function of a specific CCE index (e.g., a first or a lowest CCE index) among the indexes of CCEs for configuring the PDCCH received by the UE.

Referring to FIG. 7, each of the PUCCH resource indexes corresponds to the PUCCH resource for the ACK/NACK. If it is assumed that scheduling information on PDSCH is transmitted to a UE via PDCCH configured with $4^{th} \sim 6^{th}$ CCE, the UE transmits the ACK/NACK to the BS via a PUCCH, e.g., $4^{th}$ PUCCH, derived or calculated by the index of the $4^{th}$ CCE, which is the lowest CCE for configuring the PDCCH. FIG. 7 shows an example that maximum M' number of CCE exist in DL and maximum M number of PUCCH exist in UL. Although the M' and the M may be identical to each other, it is also possible to design a value of the M' to be different from a value of the M. And, it is also possible to make mapping of the CCE overlap the mapping of the PUCCH resource.

For instance, the PUCCH resource index may be determined as follows.

$$n^{(1)}_{PUCCH} = n_{CCE} + N^{(1)}_{PUCCH} \quad \text{[Equation 5]}$$

In this case, n(1)PUCCH indicates the PUCCH resource index to transmit the ACK/NACK and N(1)PUCCH indicates a signaling value delivered from a upper layer. The nCCE may indicate a smallest value among the CCE indexes used for PDCCH transmission. PUCCH is explained in more detail in the following description.

1.4.3. PUCCH Structure

First of all, PUCCH format 1a and 1b are explained.

In the PUCCH format 1a/1b, a symbol modulated using the BPSK or QPSK modulation scheme is multiplied by a CAZAC sequence of length 12. For instance, a result of multiplying a modulated symbol d(0) by a CAZAC sequence r(n) of length N corresponds to y(0), y(1), y(2), ..., y(N−1). The y(0), ..., the y(N−1) symbols may be called a symbol block (block of symbol). After a modulated symbol is multiplied by a CAZAC sequence, a blockwise spreading using an orthogonal sequence is applied.

For normal ACK/NACK information, a Hadamard sequence of length 4 is used. For shortened ACK/NACK information and a reference signal, a Discrete Fourier Transform (DFT) sequence of length 3 is used. For a reference signal in case of an extended CP, a Hadamard sequence of length 2 is used.

Figure 8:
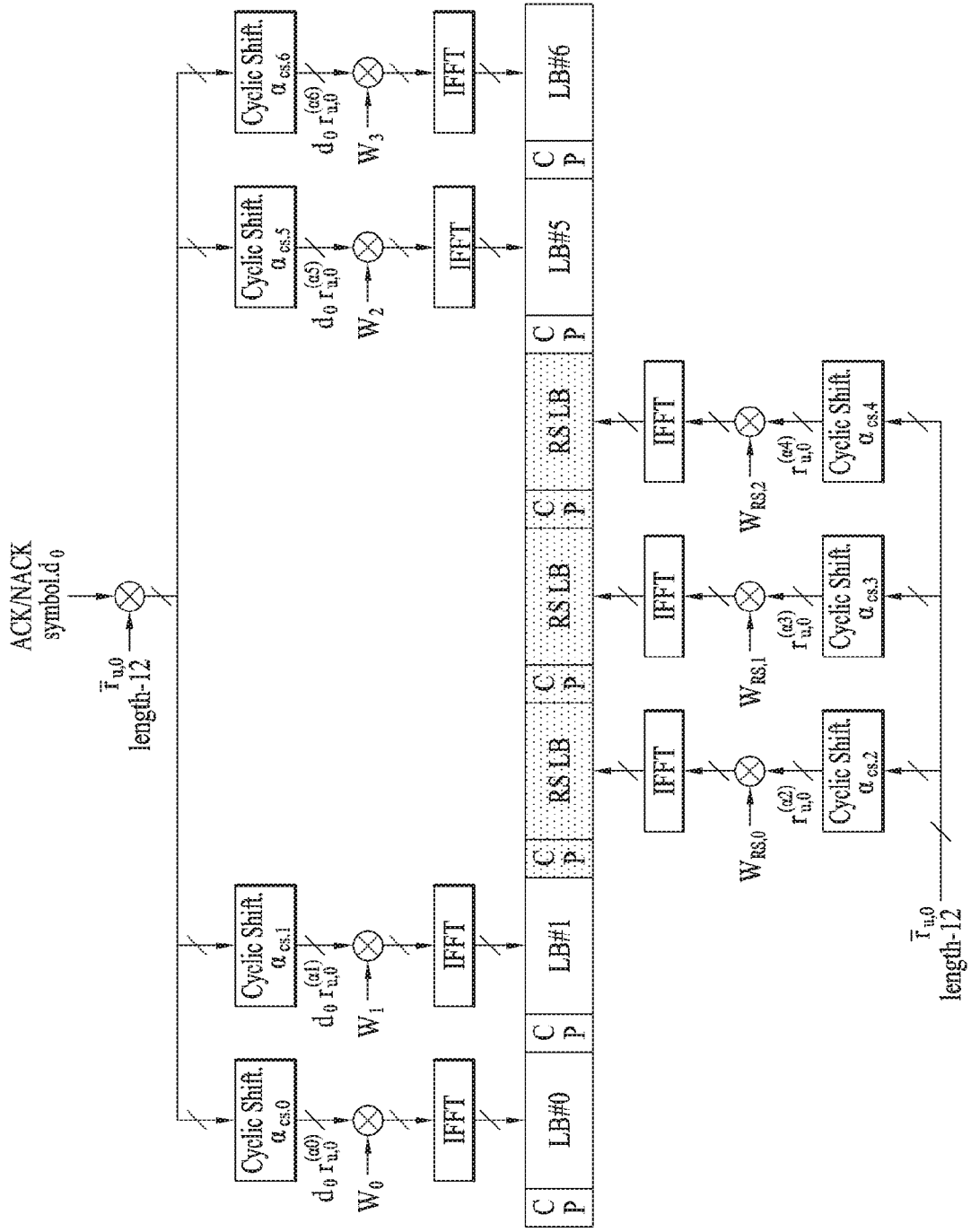
FIG. 8 is a view illustrating a structure of an ACK/NACK channel in a normal Cyclic Prefix (CP) case.

FIG. 8 is a diagram for a structure of an ACK/NACK channel in case of a normal CP. A PUCCH channel structure to transmit HARQ ACK/NACK without a CQI is exemplified in FIG. 8. Among the 7 SC-FDMA symbols included in one slot, three consecutive SC-FDMA symbols in the middle part of the slot load an RS and the rest of 4 SC-FDMA symbols load an ACK/NACK signal. Meanwhile, in case of an extended CP, two consecutive symbols situated in the middle may load the RS. The number of symbol and the position of symbol used for the RS may vary according to a control channel. And, the number of symbol and the position of symbol used for the ACK/NACK signal may vary according to the control channel as well.

Confirmation response information (in a state of not scrambled) of 1 bit and 2 bits can be represented as one HARQ ACK/NACK modulated symbol using BPSK and QPSK modulation scheme, respectively. A positive confirmation response (ACK) can be encoded by '1' and a negative confirmation response (NACK) can be encoded by '0'.

When a control signal is transmitted in an assigned band, 2 dimensional spread is applied to increase a multiplexing capacity. In particular, frequency domain spread and time domain spread are simultaneously applied to increase the number of UE and the number of control channel capable of being multiplexed. In order to spread the ACK/NACK signal in frequency domain, a frequency domain sequence is used as a base sequence. As the frequency domain sequence, a Zadoff-Chu (ZC) sequence, which is one of the CAZAC sequence, can be used. For instance, by applying a cyclic shift (CS) different from each other to the ZC sequence, which is the base sequence, multiplexing of UEs different from each other or multiplexing of control channels different from each other can be applied. The number of CS resource, which is supported by a SC-FDMA symbol for PUCCH RBs, to transmit the HARQ ACK/NACK is configured by a cell-specific upper layer signaling parameter $(\Delta^{PUCCH}_{shift})$ and $\Delta^{PUCCH}_{shift} \in \{1, 2, 3\}$ indicates 12, 6, or 4 shift, respectively.

A frequency domain spread ACK/NACK signal is spread in time domain using an orthogonal spreading code. As the orthogonal spreading code, a Walsh-Hadamard sequence or a DFT sequence can be used. For instance, an ACK/NACK signal can be spread for 4 symbols using an orthogonal sequence (w0, w1, w2, w3) of length 4. And, an RS is spread using an orthogonal sequence of length 3 or length 2. This is called an orthogonal covering (OC).

As mentioned in the foregoing description, a plurality of UEs can be multiplexed by a code division multiplexing (CDM) scheme using a CS resource in frequency domain and an OC resource in time domain. In particular, the ACK/NACK information and the RS of a plurality of the UEs can be multiplexed on an identical PUCCH RB.

For the aforementioned time domain spread CDM, the number of spreading codes supporting the ACK/NACK information is restricted by the number of RS symbols. In particular, since the number of SC-FDMA symbols transmitting the RS is less than the number of SC-FDMA symbols transmitting the ACK/NACK information, multiplexing capacity of the RS is smaller than the multiplexing capacity of the ACK/NACK information. For instance, in case of a normal CP, the ACK/NACK information can be transmitted in four symbols. In this case, not four orthogonal spreading codes but three orthogonal spreading codes are used for the ACK/NACK information. This is because only three orthogonal spreading codes can be used for the RS, since the number of RS transmission symbol is restricted to three.

An example of the orthogonal sequence used for the spread of the ACK/NACK information is shown in Table 7 and Table 8. Table 7 indicates a sequence for a symbol of length 4 and Table 8 indicates a sequence for a symbol of length 3. The sequence for the symbol of length 4 is used in PUCCH format 1/1a/1b of a normal subframe configuration. In case of configuring a subframe, the sequence for the symbol of length 4 is applied in a first slot and a shortened PUCCH format 1/1a/1b of the sequence for a symbol of length 3 can be applied in a second slot in consideration of a case that a Sounding Reference Signal (SRS) is transmitted in a last symbol of the second slot.

TABLE 7

| sequence index | {w(0), w(1), w(2), w(3)} |
|---|---|
| 0 | [+1 +1 +1 +1] |
| 1 | [+1 −1 +1 −1] |
| 2 | [+1 −1 −1 +1] |

TABLE 8

| sequence index | {w(0), w(1), w(2), w(3)} |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Meanwhile, exemplary orthogonal sequences used for RS spreading in an ACK/NACK channel are listed in [Table 9].

| sequence index | normal CP | extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In case that 3 symbols are used for RS transmission and 4 symbols are used for ACK/NACK information transmission in a subframe of a normal CP, for instance, if 6 Cyclic Shifts (CSs) in frequency domain and 3 Orthogonal Cover (OC) resources in time domain are available, HARQ confirmation responses from a total 18 different UEs can be multiplexed in one PUCCH RB. In case that 2 symbols are used for RS transmission and 4 symbols are used for ACK/NACK information transmission in a subframe of an extended CP, for instance, if 6 CSs in frequency domain and 2 OC resources in time domain are available, HARQ confirmation responses from a total 12 different UEs can be multiplexed in one PUCCH RB.

Subsequently, PUCCH format 1 is explained. A Scheduling Request (SR) is transmitted in a manner that a UE makes a request to be scheduled or the UE does not make a request to be scheduled. An SR channel reuses an ACK/NACK channel structure of a PUCCH format 1a/1b and is configured with an On-Off Keying (OOK) scheme based on an ACK/NACK channel design. A reference signal is not transmitted on the SR channel. Hence, a sequence of length 7 is used in case of a normal CP and a sequence of length 6 is used in case of an extended CP. A different cyclic shift or an orthogonal cover can be assigned to an SR and an ACK/NACK. In particular, a UE transmits a HARQ ACK/NACK via a resource allocated for an SR to transmit a positive SR. The UE transmits the HARQ ACK/NACK via a resource allocated for an ACK/NACK to transmit a negative SR.

Subsequently, PUCCH format 2/2a/2b is explained. The PUCCH format 2/2a/2b is a control channel to transmit a channel measurement feedback (CQI, PMI, RI).

A reporting cycle of the channel measurement feedback (hereinafter commonly called CQI information) and a frequency unit (or a frequency resolution), which becomes an object of measuring, can be controlled by an eNB. A periodic and an aperiodic CQI report can be supported in time domain. A PUCCH format 2 is used for the periodic report only and PUSCH can be used for the aperiodic report. In case of the aperiodic report, an eNB can direct a UE to transmit a scheduled resource in a manner of loading a separate CQI report on the scheduled resource to transmit a UL data.

Figure 9:
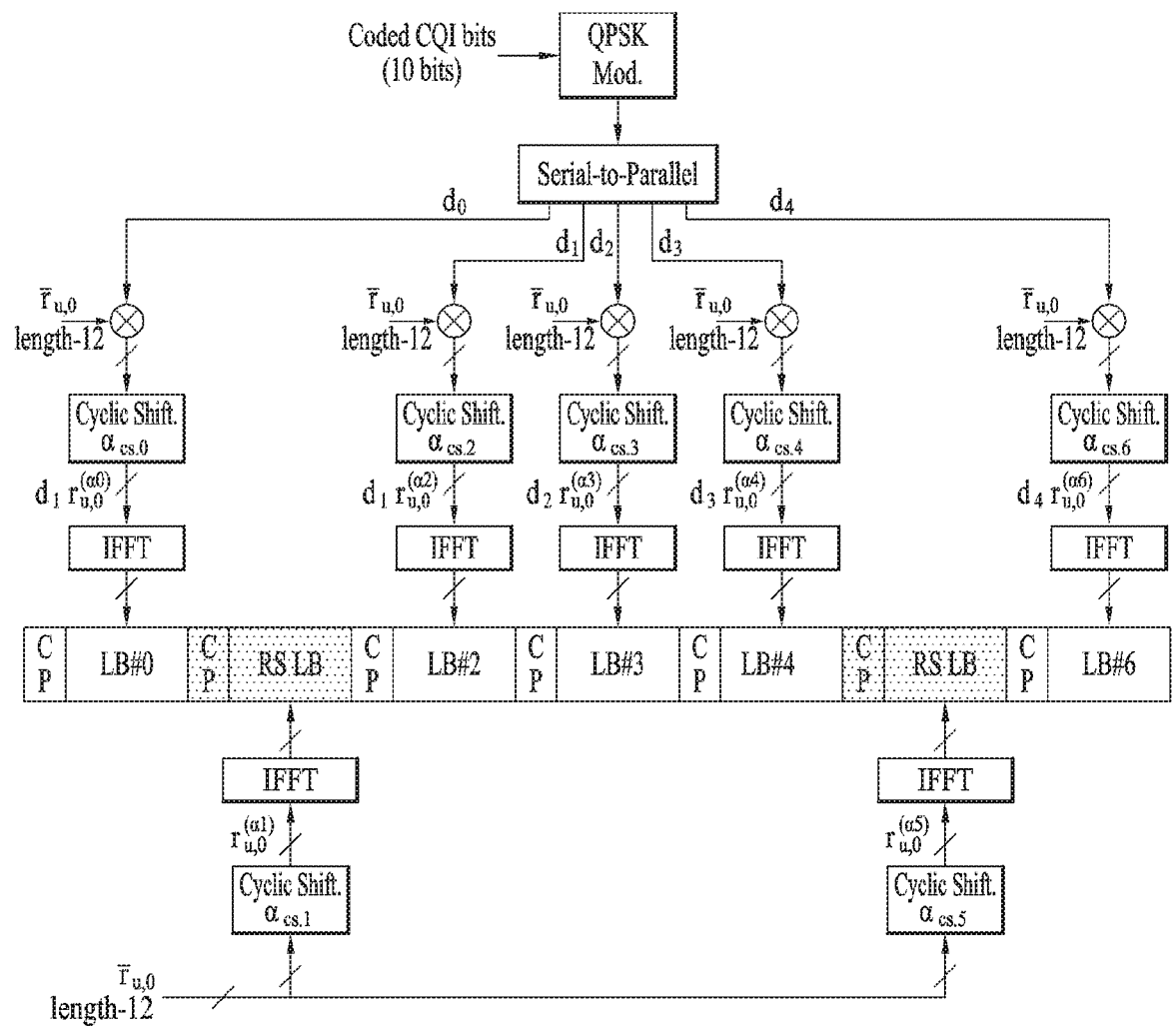
FIG. 9 is a view illustrating a structure of a Channel Quality Indicator (CQI) channel in a normal CP case.

FIG. 9 is a view illustrating a structure of a CQI channel in a normal CP case. Among FDMA symbols 0 to 6 in one slot, SC-FDMA symbols 1 and 5 (i.e., second and sixth symbols) are used to transmit a Demodulation Reference Signal (DMRS) and the rest of the SC-FDMA symbols are used to transmit CQI information. Meanwhile, in case of an extended CP, one SC-FDMA symbol (i.e., SC-FDMA symbol 3) is used to transmit a DMRS.

PUCCH format 2/2a/2b supports a modulation performed by a CAZAC sequence and a symbol modulated by QPSK scheme is multiplied by a CAZAC sequence of length 12. A CS of a sequence is modified between a symbol and a slot. An orthogonal covering is used for a DMRS.

Among the 7 SC-FDMA symbols included in one slot, an RS (DMRS) is loaded on 2 SC-FDMA symbols apart from as much as a space of 3 SC-FDMA symbols and CQI information is loaded on the rest of the 5 SC-FDMA symbols. Using two RSs in one slot is to support a fast UE. And, each UE is distinguished using a CS sequence. CQI information symbols are delivered to all SC-FDMA symbols in a manner of being modulated and an SC-FDMA symbol is configured with one sequence. In particular, a UE transmits a CQI in a manner of modulating the CQI with each sequence.

The number of symbols capable of being transmitted in one TTI corresponds to 10 and a modulation scheme of CQI information is determined up to QPSK. In case of using QPSK mapping for an SC-FDMA symbol, since a CQI value of 2-bit can be loaded, the CQI value of 10-bit can be loaded in one slot. Hence, the CQI value of maximum 20 bits can be loaded in one subframe. A frequency domain spreading code is used to spread the CQI information in frequency domain.

A CAZAC sequence (e.g., a ZC sequence) of length 12 can be used as the frequency domain spreading code. Each control channel can be distinguished by applying the CAZAC sequence including a cyclic shift value different from each other. An IFFT is performed on the frequency domain spread CQI information.

12 different UEs can be orthogonally multiplexed in an identical PUCCH RB by 12 equidistant CSs. In case of a normal CP, a DMRS sequence on the SC-FDMA symbol 1 and 5 (in case of an extended CP, SC-FDMA symbol 3) is similar to a CQI signal sequence in frequency domain. Yet, a modulation applied to the CQI information is not applied to the DMRS sequence. A UE can be semi-statically configured by an upper layer signaling to periodically report different types of CQI, PMI and RI on a PUCCH resource indicated by a PUCCH resource index $(n^{(2)}_{PUCCH})$.

In this case, the PUCCH resource index $(n^{(2)}_{PUCCH})$ is information to indicate a PUCCH region used for PUCCH format 2/2a/2b transmission and a cyclic shift (CS) value to be used.

Subsequently, an enhanced-PUCCH (e-PUCCH) format is explained. The e-PDCCH may correspond to a PUCCH format 3 of LTE-A system. A block spreading scheme can be applied to an ACK/NACK transmission using the PUCCH format 3.

Unlike a legacy PUCCH format 1 series or 2 series, the block spreading scheme is a scheme for modulating a control signal transmission using an SC-FDMA scheme. As shown in FIG. 10, a symbol sequence can be transmitted in time domain in a manner of being spread using an orthogonal cover code (OCC). By using the OCC, control signals of a plurality of UEs in an identical RB can be multiplexed. In case of the aforementioned PUCCH format 2, one symbol sequence is transmitted in a manner of being spanned in time domain and the control signals of a plurality of the UEs are multiplexed using the CS (cyclic shift) of the CAZAC sequence. On the other hand, in case of the block spreading-based PUCCH format (e.g., PUCCH format 3), one symbol sequence is transmitted in a manner of being spanned in frequency domain and the control signals of a plurality of the UEs are multiplexed by using time domain spreading using the OCC.

FIG. 10 (a) indicates an example of generating 4 SC-FDMA symbols (i.e., data part) using an OCC of length 4 (or Spreading Factor (SF)=4) in one symbol sequence and are transmitted in one slot. In this case, 3 RS symbols (i.e., RS part) can be used in one slot.

FIG. 10 (b) indicates an example of generating 5 SC-FDMA symbols (i.e., data part) using an OCC of length 5 (or SF=5) in one symbol sequence and are transmitted in one slot. In this case, 2 RS symbols can be used in one slot.

Referring to the example of FIG. 10, the RS symbol can be generated from a CAZAC sequence to which a specific cyclic shift value is applied and can be transmitted in a form that a prescribed OCC is applied (or multiplied) to a plurality of RS symbols. And, in the example of FIG. 10, if it is assumed that 12 modulation symbols are used according to each OFDM symbol (or SC-FDMA symbol) and each modulation symbol is generated by QPSK scheme, maximum bit number capable of being transmitted in one slot becomes 12*2=24 bits. Hence, the bit number capable of being transmitted by 2 slots becomes a total 48 bits. As mentioned earlier, in case of using the PUCCH channel structure of the block spreading scheme, it enables to transmit control information of an extended size compared to a legacy PDCCH format 1 series and 2 series.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC CONNECTED state, if CA is not configured for the UE or the UE does not support CA, a single serving cell including only a PCell exists for the UE. On the contrary, if the UE is in RRC CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 11:
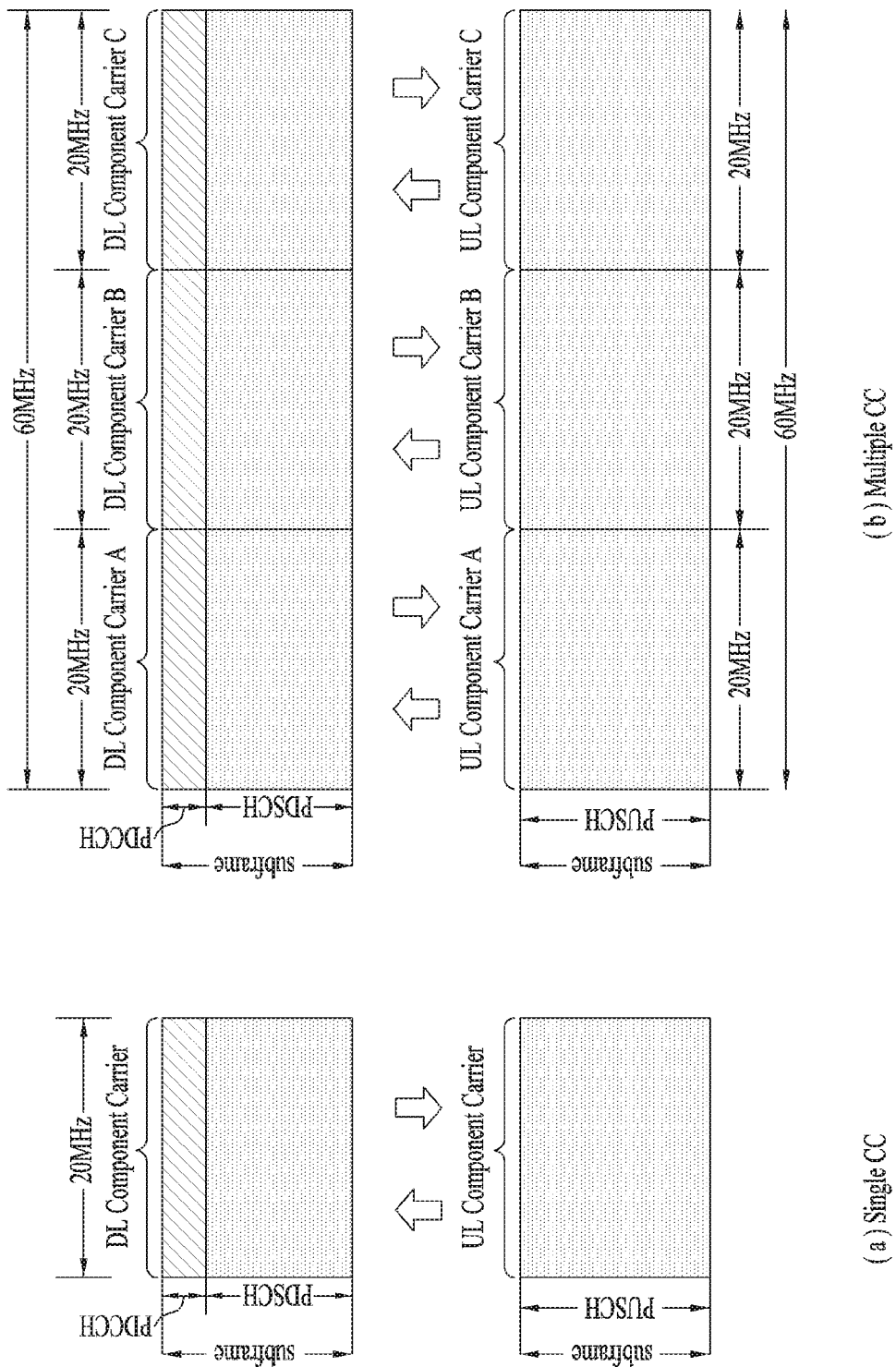
FIG. 11 is a view illustrating exemplary Component Carriers (CCs) and Carrier Aggregation (CA) in a Long Term Evolution-Advanced (LTE-A) system.

FIG. 11 illustrates an example of CCs and CA in the LTE-A system, which are used in embodiments of the present disclosure.

FIG. 11(a) illustrates a single carrier structure in the LTE system. There are a DL CC and a UL CC and one CC may have a frequency range of 20 MHz.

FIG. 11(b) illustrates a CA structure in the LTE-A system. In the illustrated case of FIG. 11(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 12:
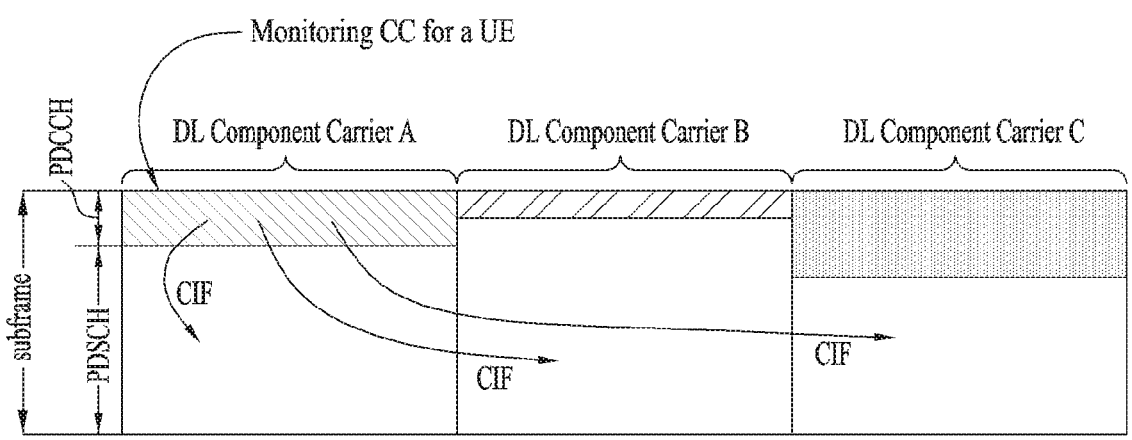
FIG. 12 is a view illustrating a subframe structure based on cross-carrier scheduling in the LTE-A system.

FIG. 12 illustrates a cross carrier-scheduled subframe structure in the LTE-A system, which is used in embodiments of the present disclosure.

Referring to FIG. 12, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 13:
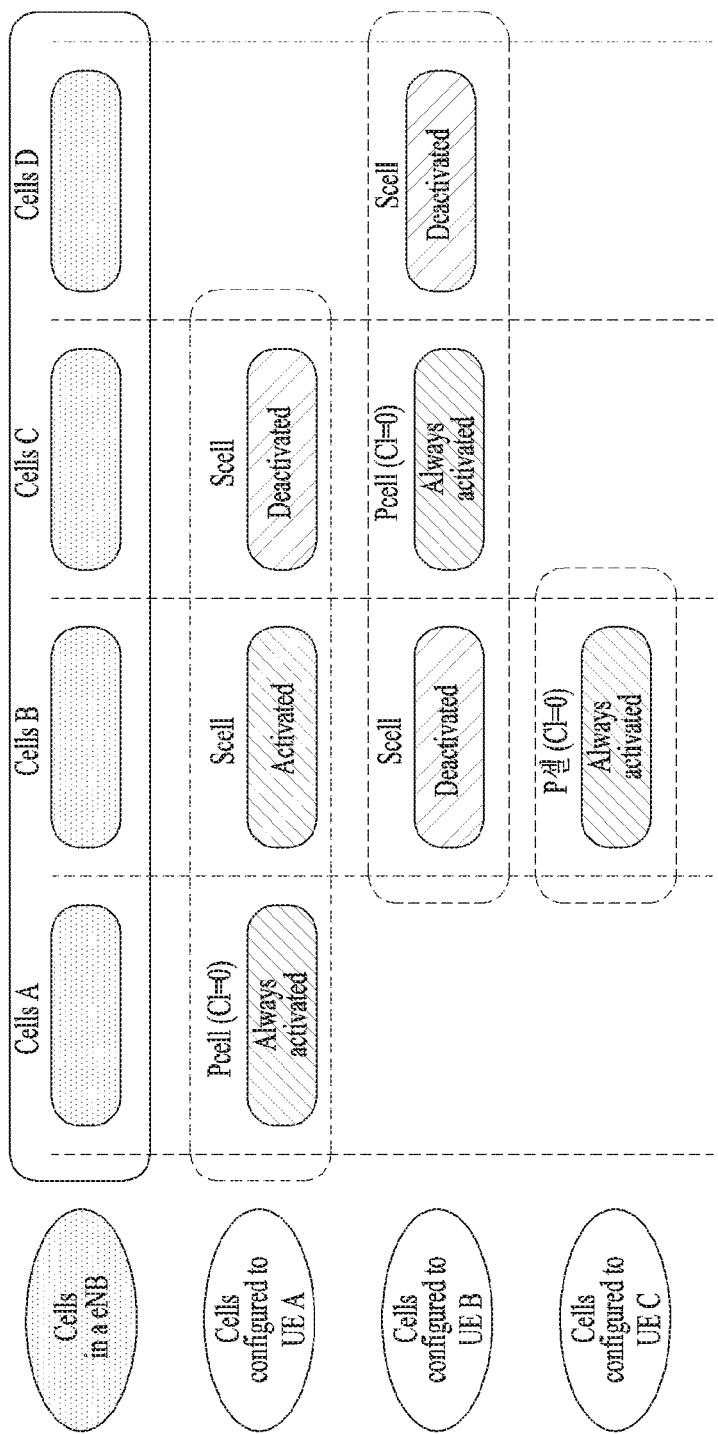
FIG. 13 is a view illustrating an exemplary serving cell configuration based on cross-carrier scheduling.

FIG. 13 is a view illustrating an exemplary serving cell configuration based on cross-carrier scheduling.

Referring to FIG. 13, an eNB (or BS) and/or UEs for use in a radio access system supporting CA may include one or more serving cells. In FIG. 13, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 13 may be configured per UE. The above-mentioned cells selected from among cells of the eNB, cell addition may be applied to CA on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and SRS transmission. The deactivated cell is configured not to transmit/receive PDSCH/PUSCH signals by an eNB command or a timer operation, and Common Reference Signal (CRS) reporting and SRS transmission are interrupted.

2.3 CA Environment-Based CoMP Operation

Hereinafter, a Coordinated Multi-Point (CoMP) transmission operation applicable to the embodiments of the present disclosure will be described.

In the LTE-A system, CoMP transmission may be implemented using a CA function in the LTE. P it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as Joint Transmission (JT), CS/CB and dynamic cell selection for one UE.

However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

3. Transmission Timing Adjustments

In the LTE system, the amount of time that a signal transmitted from a UE takes to reach an eNB may vary depending on a radius of a cell, a location of the UE in a cell, mobility of the UE, and the like. That is, unless the eNB controls a UL transmission timing of each UE, interference may occur between UEs while each UE communicates with the eNB. Moreover, this may increase an error occurrence rate of the eNB. The amount of time that the signal transmitted from the UE takes to reach the eNB may be referred to as a Timing Advance (TA). Assuming that a UE is randomly located randomly in a cell, the TA from the UE to the eNB may vary depending on a location of the UE. For instance, if the UE is located at the boundary of the cell instead of at the center of the cell, the TA of the UE may be increased. In addition, the TA may vary depending on a frequency band of the cell. Thus, the eNB needs to be able to manage or adjust transmission timings of UEs in the cell to prevent the interference between UEs. The management or adjustment of transmission timings, which is performed by the eNB, may be referred to as TA maintenance or time alignment.

The TA maintenance or time alignment may be performed in a random access procedure. During the random access procedure, an eNB may receive a random access preamble from a UE and then calculate a TA value using the received random access preamble. The UE may receive the calculated TA value through a random access response and then update a signal transmission timing based on the received TA value. Alternatively, after receiving an uplink reference signal (e.g., SRS) that is transmitted periodically or aperiodically from the UE, the eNB may calculate the TA. Thereafter, the UE may update the signal transmission timing based on the calculated TA value.

As described above, the eNB may measure UE's TA through the random access preamble or the uplink reference signal and then inform the UE of an adjustment value for the time alignment. Here, the adjustment value for time alignment may be referred to as a Timing Advance Command (TAC). The TAC may be processed by a MAC layer. If a UE receives the TAC from the eNB, the UE assumes that the received TAC is valid only for a prescribed time. A Time Alignment Timer (TAT) may be used for indicating the prescribed time. A TAT value may be transmitted to the UE through higher layer signaling (e.g., RRC signaling).

A UE may start transmission of uplink radio frame #i $(N_{TA}+N_{TAoffset}) \times T_s$ seconds before the start of a corresponding downlink radio frame, where $0 \leq N_{TA} \leq 20512$, $N_{TAoffset}=0$ in case of a FDD frame structure, and $N_{TAoffset}=624$ in case of a TDD frame structure. $N_{TA}$ may be indicated by the TAC and $T_s$ represents a sampling time. The UL transmission timing may be adjusted in unit of a multiple of $16T_s$. The TAC may be given as 11 bits in the random access response and it may indicate a value of 0 to 1282. In addition, $N_{TA}$ may be given TA*16. Alternatively, the TAC may be given as 6 bits and it may indicate a value of 0 to 63. In this case, $N_{TA}$ is given as $N_{TA,old}+(TA-31)*16$. The TAC received in subframe n may be applied starting from subframe n+6.

3.1. Timing Advance Group (TAG)

In case that a UE use a plurality of serving cells, there may be serving cells having similar TA characteristics. For example, serving cells having similar frequency characteristics (e.g. frequency bands) or similar propagation delays may have similar TA characteristics. Thus, when carrier aggregation is performed, serving cells having similar TA characteristics may be managed as a group to optimize signaling overhead caused by synchronization adjustment of a plurality of uplink timings. Such a group may be referred to as a TAG. Serving cell(s) having similar TA characteristics may belong to one TAG and at least one serving cell(s) in the TAG must have uplink resources. For each serving cell, an eNB may inform a UE of TAG allocation using a TAG identifier through higher layer signaling (e.g. RRC signaling). Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or secTAG). A secondary TAG identifier (sTAG ID) may be used to indicate an sTAG corresponding to an SCell. If an sTAG ID is not configured for an SCell, the SCell may be configured as a part of pTAG. One TA may be commonly applied to all CCs included in one TA group.

Hereinafter, a description will be given of a structure of TAC MAC CE for transmitting the TAC to a UE.

3.2. Timing Advance Command MAC CE (TAC MAC CE)

In the 3GPP LTE system, Medium Access Control (MAC) Protocol Data Unit (PDU) includes a MAC header, a MAC Control Element (CE), and at least one MAC Service Data Unit (SDU). The MAC header includes at least one sub-header. Each sub-header corresponds to the MAC CE and MAC SDU. The sub-header is used to represent lengths and properties of the MAC CE and MAC SDU.

The MAC SDU is a data block provided from a higher layer (e.g., an RLC layer or an RRC layer) of a MAC layer. The MAC CE is used to deliver control information of the MAC layer such as a buffer status report.

The MAC sub-header includes the following fields

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC sub-header.

The F and L fields are not included in a MAC sub-header corresponding to a fixed-sized MAC CE.

Figure 14:
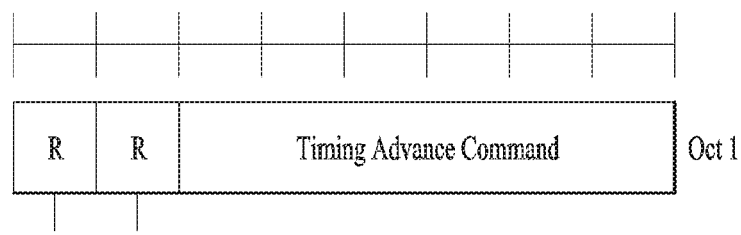
FIG. 14 is a view illustrating a structure of a Timing Advance Command (TAC) Medium Access Control (MAC) Control Element (CE)

FIG. 14 illustrates a TAC MAC CE as a fixed-sized MAC CE. TAC is used for controlling the amount of time adjustment to be applied to a UE and it is identified by the LCID of the MAC PDU sub-header. Here, the MAC CE has a fixed size and it is configured with a single octet as shown in FIG. 10.

R (1 bit): A reserved field.

TAC (timing advance command) (6 bits): It indicates a TA index value (e.g., 0, 1, 2, ..., 63) used for controlling the amount of time adjustment to be applied to a UE.

Although the adjustment value for the time alignment may be transmitted through the TAC, it may be transmitted through a random access response (hereinafter abbreviated as RAR) in response to a random access preamble transmitted from a UE for initial access.

3.3. A Case of Having a Plurality of TAs

Figure 15:
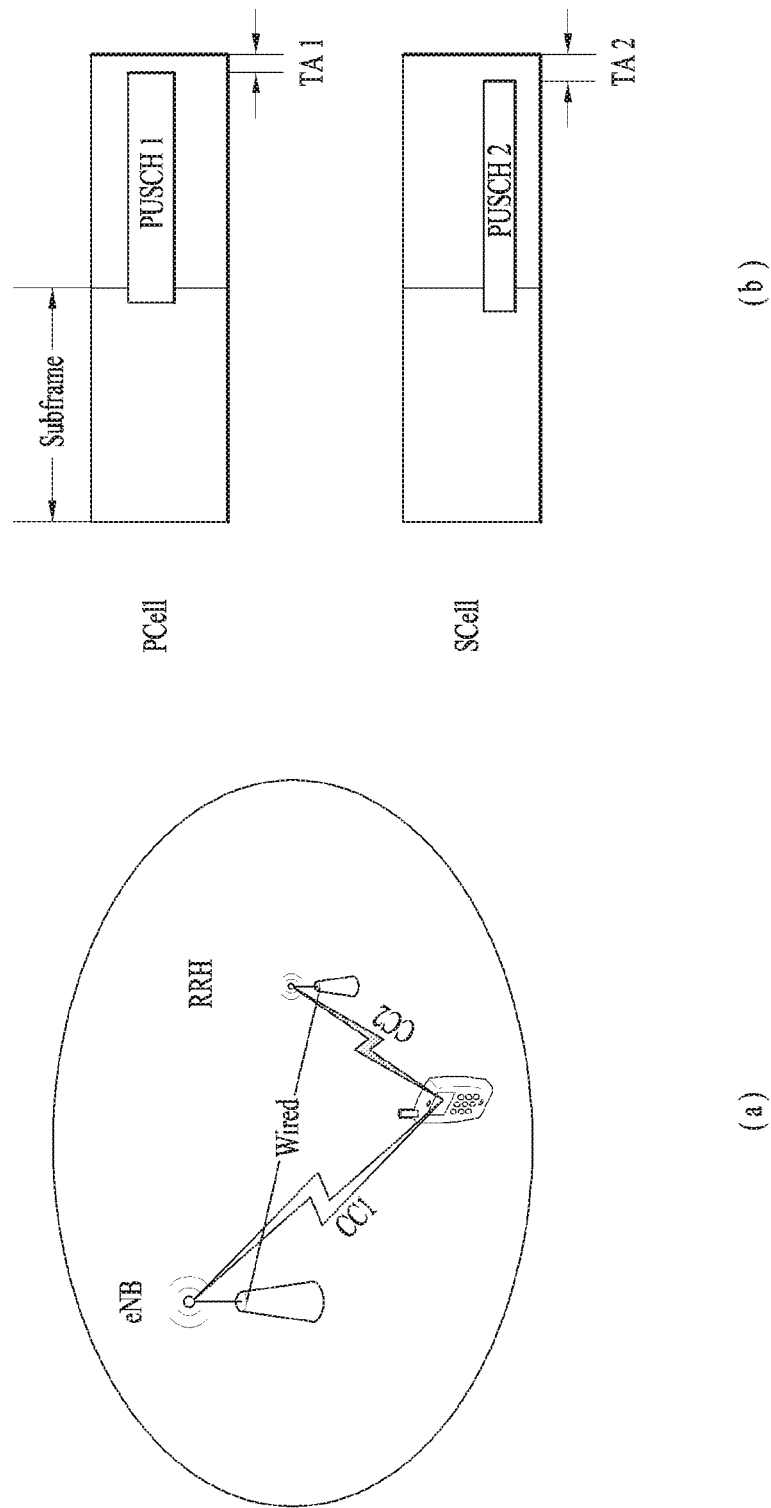
FIG. 15 is a view illustrating exemplary aggregation of a plurality of cells having different frequency characteristics.

FIG. 15 illustrates exemplary aggregation of a plurality of cells having different frequency characteristics. The LTE-A system allows a UE to aggregate a plurality of cells belonging to different frequency bands (i.e., separated far from each other in the frequency domain), a plurality of cells with different propagation characteristics, or a plurality of cells having different coverage. Moreover, in case of a specific cell, it may be considered that Remote Radio Heads (RRHs) such as repeaters are deployed within the cell for the purpose of coverage expansion or coverage hole elimination. For instance, inter-site carrier aggregation may be performed between cells formed in different locations. Here, the RRH can be referred to as a Remote Radio Unit (RRU). The eNB and RRH (or RRU) can be referred to as a node or a transmitting node.

For instance, referring to FIG. 15 (a), a UE aggregates two cells (i.e., cell 1 and cell 2). The cell 1 (or cc 1) may be formed to perform direct communication with an eNB without the RRH and the cell 2 may be formed to use the RRH due to limited coverage. In this case, a propagation delay (or eNB's reception timing) of a UL signal transmitted from a UE through the cell 2 (or CC 2) may be different from a propagation delay (or eNB's reception timing) of a UL signal transmitted through the cell 1 due to a location of the UE, frequency characteristics, etc. When a plurality of cells have different propagation delay characteristics as described above, multiple TAs are inevitable.

FIG. 15 (b) illustrates a plurality of cells with different TAs. Referring to FIG. 11 (b), a UE aggregates two cells (e.g., PCell and SCell). The UE may transmit a UL signal (PUSCH) by applying different TA to each of the two cells.

4. Device-to-Device (D2D) Communication

Hereinafter, a D2D communication environment applicable to the present invention will briefly be described.

The D2D communication refers to communication between an electronic device and another electronic device. In a broad sense, the D2D communication refers to wire or wireless communication between electronic devices or communication between a machine and a device controlled by a user. Recently, the D2D communication may generally mean wireless communication between electronic devices operating without human involvement.

Figure 16:
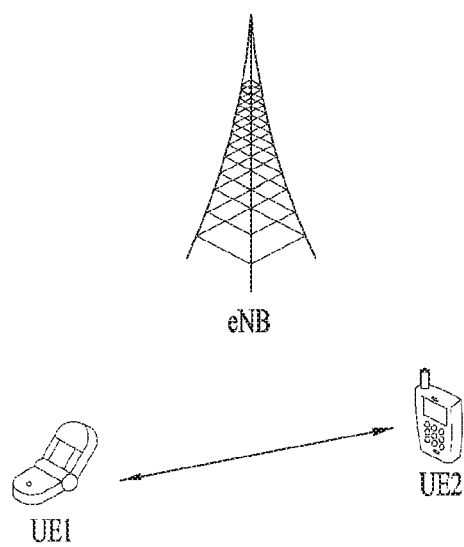
FIG. 16 is a view illustrating a communication system applicable to the present disclosure.

FIG. 16 is a conceptual diagram for explaining D2D communication. In FIG. 12, a device-to-device or UE-to-UE communication scheme is illustrated as an example of the D2D communication. According to this scheme, data can be exchanged between UEs without intervention of an eNB. A direct link established between devices can be referred to as a D2D link. Compared to the conventional eNB-based communication, the D2D communication has advantages in that latency is reduced and the amount of required resources is small. Here, the UE means a terminal of a user. However, if a network equipment such as an eNB transmits and receives signals according to the communication scheme between UEs, the network equipment can also be considered as the UE.

For D2D communication, time synchronization and frequency synchronization should be acquired between two UEs. In general, if the two UEs are located within the coverage of an eNB, the UEs are synchronized to a PSS/SSS or CRS transmitted by the eNB, and the time/frequency synchronization may be maintained at a level that enables direct signal transmission and reception between the two UEs. Herein, a synchronization signal for D2D communication will be referred to as a D2 DSS. The D2DSS may include synchronization signals such as the PSS/SSS of the LTE system. A PSS/SSS transmitted for D2D communication is referred to as a Primary D2D Synchronization Signal (PD2DSS)/Secondary D2D Synchronization Signal (SD2DSS), or a Primary Sidelink Synchronization Signal (PSSS)/Secondary Sidelink Synchronization Signal (SSSS). Like the PSS of the LTE system, the PSSS may be used to acquire a coarse timing, and may be based on a ZC sequence. Like the SSS of the LTE system, the SSSS may be used for fine synchronization, and may be based on an m-sequence. A Physical D2DSS (PD2DSCH or Physical Sidelink Broadcast Channel (PSBCH)) refers to a physical channel carrying required information for synchronization, such as a system bandwidth and the indexes of a radio frame and a subframe.

Meanwhile, D2D signals transmitted via a sidelink may be classified largely into discovery and communication signals. The discovery signal may be represented as a message including the ID of a transmitting UE or the like. Since discovery of a UE by the discovery signal tolerates a long time delay, resources for transmission of the discovery signal may have a relatively long periodicity. On the other hand, the communication signal delivers general data (e.g., voice or video information) that a UE wants to transmit. Since the data should be completely transmitted for a short time, resources for transmission of the communication signal may have a relatively short periodicity.

More specifically, the discovery signal is used for one UE to identify a plurality of adjacent UEs. An example of a sidelink channel for transmission and reception of the discovery signal is a Physical Sidelink Discovery Channel (PSDCH). The communication signal delivers general data (e.g., voice or video information) that a UE wants to transmit. Examples of a sidelink channel for transmission and reception of the communication signal include a Physical Sidelink Broadcast Channel (PSBCH), a Physical Sidelink Shared Channel (PSSCH), and a Physical Sidelink Control Channel (PSCCH).

4.1 Sidelink Resources

A sidelink radio frame includes 10 subframes, each subframe including two slots in the time domain. One slot includes a plurality of SC-FDMA symbols in the time domain and a plurality of RBs in the frequency domain. Since SC-FDMA is used for a sidelink in the 3GPP LTE system, an SC-FDMA symbol represents one symbol period. An RB as a resource allocation unit may include a plurality of contiguous subcarriers in one slot. The last SC-FDMA symbol of a sidelink subframe may be set as a Guard Period (GP), and may not be used for sidelink transmission.

A sidelink CP may be configured individually for a discovery signal, a sidelink control signal, a sidelink data signal, a broadcast signal, and a synchronization signal. The configuration may be set for each resource pool for a discovery signal, a control signal, and so on. A broadcast signal and a synchronization signal may use the same CP. Now, a description will be given of a resource grid for a sidelink slot.

A sidelink slot includes $N^{SL}_{symb}$ SC-FDMA symbols in the time domain and $N^{SL}_{RB}$ RBs in the frequency domain. Since each RB includes $N^{RB}_{SC}$ subcarriers, a DL slot includes $N^{SL}_{RB} \times N^{RB}_{SC}$ subcarriers in the frequency domain. Each element in a resource grid is called an RE, and one RE is indicated by the index of one SC-FDMA symbol and the index of one subcarrier. One RB includes $N^{SL}_{symb} \times N^{RB}_{SC}$ REs. A sidelink bandwidth $N^{SL}_{RB}$ may be equal to the number of RBs $N^{UL}_{RB}$ of a UL slot, set by a cell, or may be a predetermined value.

4.2 Sidelink Resource Pool

A resource pool may be defined as a set of specific resources for a sidelink operation. A UE may transmit and receive signals by selecting resources in a related resource pool. A different sidelink resource pool may be defined according to the type of a transmission signal.

In FIG. 16, UE1 may select a Resource Unit (RU) corresponding to specific resources in a resource pool being a set of resources, and transmit a D2D signal in the selected RU. The resource pool in which UE1 may transmit a signal is configured for a receiving UE, UE2, and UE2 detects the signal of UE1 in the resource pool.

If UE1 is located within the coverage of an eNB, the eNB may indicate the resource pool to UE1 by configuration information. If UE1 is located outside the coverage of the eNB, another UE may indicate the resource pool to UE1, or the resource pool may be determined to be preset resources. In general, a resource pool includes a plurality of RUs, and each UE may select one or more RUs and use the selected RU(s) in transmitting and receiving its D2D signal.

Figure 17:
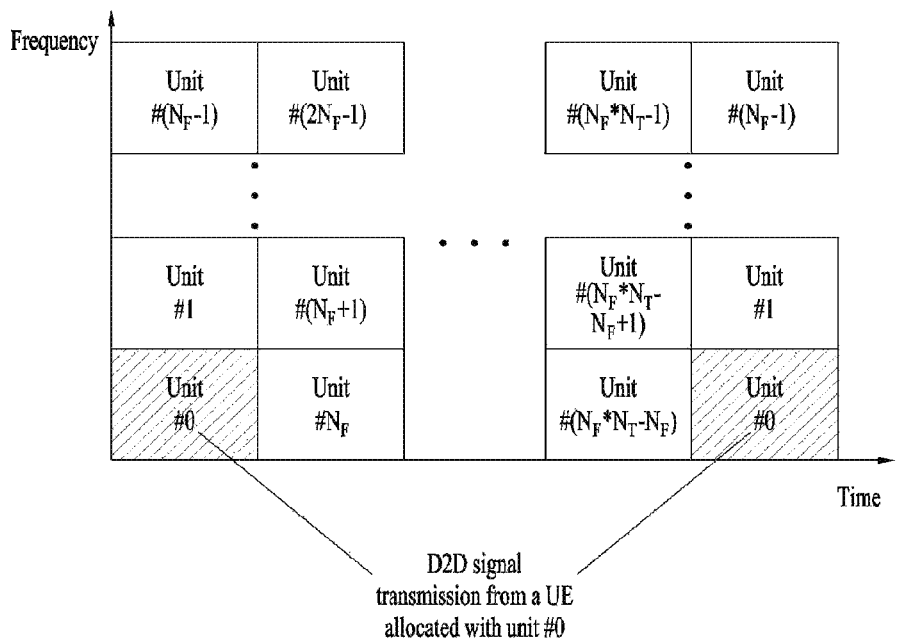
FIG. 17 is a view illustrating an exemplary Resource Unit (RU) configuration applicable to the present disclosure.

FIG. 17 illustrates an exemplary RU configuration. A total of $N_F \times N_T$ RUs are defined by dividing total frequency resources by $N_F$ and dividing total time resources by $N_T$. Herein, it may be said that a corresponding resource pool is repeated every $N_T$ subframes. One RU may be periodically repeated, as illustrated in FIG. 17.

Or to achieve time diversity or frequency diversity, the index of a Physical RU (PRU) to which a Logical RU (LRU) is mapped may be changed over time in a predetermined pattern. In this RU structure, a resource pool may mean a set of RUs available for transmission or reception of a UE that intends to transmit a D2D signal.

A subframe pool and an RB pool may be defined as resource pools. In the illustrated case of FIG. 17, the total $N_T$ time resources may correspond to a subframe pool in the time domain, and the total $N_F$ time resources may correspond to an RB pool in the frequency domain.

The above-described resource pools may be classified into a plurality of types. First, the resource pools may be classified according to the content of a D2D signal transmitted in each resource pool. For example, the content of D2D signals may be categorized into PSCCH, PSDCH, and PSSCH, and a resource pool may be configured separately for each of the PSCCH, the PSDCH, and the PSSCH.

The PSCCH is a control channel carrying a signal including information about the positions of resources that each transmitting UE uses for transmission of a subsequent PSDCH, and information required for demodulation of the data channel such as a Modulation and Coding Scheme (MCS) or a MIMO transmission scheme. The PSCCH may also be called a Scheduling Assignment (SA). Control information transmitted on the PSCCH is referred to as Sidelink Control Information (SCI). Specifically, SCI includes sidelink RB allocation information or time resource pattern information. It is possible to transmit a sidelink control signal multiplexed with sidelink data in the same RU. In this case, an SA resource pool or a PSCCH resource pool may refer to a resource pool in which an SA is transmitted multiplexed with sidelink data.

The PSSCH is a channel on which the transmitting UE transmits user data in resources indicated by the SA or the PSCCH. A resource pool configured for the PSSCH is referred to as a PSSCH resource pool. If it is also possible to transmit an SA multiplexed with sidelink data in the same RU, only a data channel except for SA information may be transmitted in the PSSCH resource pool. For example, an RE used for transmission of SA information in an individual RU of an SA resource pool is still used for transmission of sidelink data in the PSSCH resource pool.

The PSDCH is a channel on which the transmitting UE transmits a message including information such as its ID so that an adjacent UE may discover the transmitting UE. A resource pool for the PSDCH is referred to as a PSDCH resource pool.

Even though the above-described D2D signals have the same content, they may use different resource pools according to the transmission and reception properties of the D2D signals. For example, even though D2D signals are the same PSSCH or PSDCH, different resource pools may be configured for the D2D signals according to the transmission timing determination schemes, resource allocation schemes, or signal formats of the D2D signals.

For example, different resource pools may be configured depending on whether D2D signals are transmitted at a reception time of a reference synchronization signal or with a predetermined TA. Further, for example, different resource pools may be configured depending on whether an eNB indicates transmission resources for an individual signal to an individual transmitting UE or the individual transmitting UE autonomously selects transmission resources for an individual signal in a pool. Further, different resource pools may be configured depending on the signal formats of D2D signals, for example, the number of symbols that each D2D signal occupies in one subframe, or the number of subframes used for transmission of one D2D signal.

4.2. Relationship Between Sidelink and UL/DL

Figure 18:
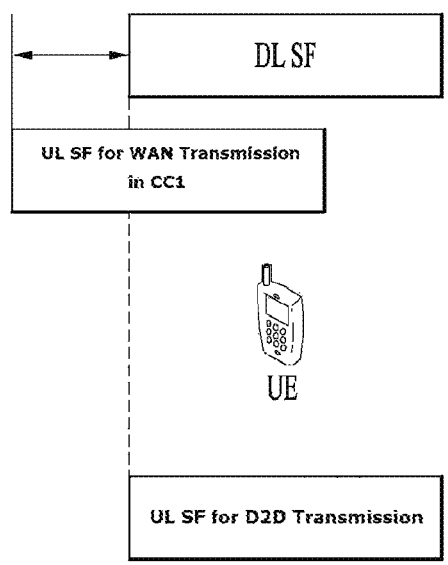
FIG. 18 is a view illustrating exemplary overlap between a sidelink signal and an uplink signal in the time domain.

In some cases, it may occur that a sidelink signal overlaps with another signal, as illustrated in FIG. 18. While a sidelink signal transmission is shown in FIG. 18 as overlapped with a UL or DL transmission between an eNB and a UE, an overlap may also occur between sidelink signals. In this case, there may be a need for a rule of determining which signal to be transmitted or received on the part of the UE.

In this case, for the same carrier frequency, a sidelink signal or channel wholly or partially overlapped with a UL signal allocated to the same UE may not be transmitted.

Even though the sidelink signal is transmitted in a different carrier frequency, the UE having a limited transmission capacity may give priority to the UL transmission. Further, sidelink signals may have priority in the order of PSSS, SSSS, PSBCH, PSCCH, PSSCH, and PSDCH. Meanwhile, a UE having a limited reception capacity may give priority to DL reception, sidelink communication signal reception, sidelink discovery signal reception on a carrier configured by an eNB, and discovery signal reception on a carrier not configured by an eNB, in this order.

As described above, it is typical that a legacy D2D signal has a lower priority level than a UL signal that a UE transmits to an eNB. This is because a D2D signal does not pass through an eNB and thus tolerates a longer transmission delay on a radio link than a UL signal that should be transmitted to a final destination through the eNB and a backhaul network. For example, it may be regulated that if a legacy D2D signal transmission and a UL signal transmission are overlapped with each other for a UE and the UE is not capable of transmitting both the signals, the UE should perform the UL signal transmission, giving up the D2D signal transmission. However, it may be regulated that in the case where the UE is capable of transmitting the two signals, for example, the UE is capable of transmitting the two signals in different frequency resources, if the sum of transmission power of the two signals exceeds a maximum transmission power of the UE, the UE should allocate power first to the UL signal and then the remaining power to the D2D signal transmission.

However, it may not be proper to apply the above-described legacy prioritization to an emergency D2D signal. For example, in regards to a D2D signal indicating the breakdown of a vehicle between fast moving UEs such as vehicles, the D2D signal should be transmitted very fast to an adjacent UE to thereby complete the signal transmission and reception before occurrence of an actual problem and thus prevent an accident. If this emergency D2D signal is subjected to the legacy prioritization, the emergency D2D signal has a low priority level and thus its transmission may be discontinued or have low power, even though an emergency occurs actually. As a result, desired performance is not achieved.

To solve the problem, the present disclosure proposes a prioritization method and a transmission and reception resource determination method, which are adapted to an emergency D2D signal. The emergency D2D signal may mean a signal including safety information transmitted via a sidelink. While the term 'emergency D2D signal' is used hereinbelow, the 'emergency D2D signal' may be expressed in various manners, for example, by the type, class, usage, and/or priority of a specific D2D signal.

4.3 Priority of Emergency D2D Signal

First of all, the emergency D2D signal may have priority over other normal D2D signals. In the case where it is said that a signal has a higher priority level, if it is impossible to transmit two signals at the same time, it may mean that the signal with the higher priority is transmitted.

Further, in the case where both the signals can be transmitted, for example, in different carriers or frequency resources, if the sum of the transmission power of the two signals exceeds a maximum transmission power of a UE, it may mean that power is assigned first to the signal with the higher priority level. Needless to say, if the sum of the transmission power of the two signals exceeds the maximum transmission power of the UE, a predefined minimum power or a minimum ratio of the total power of the UE is assigned to the higher-priority signal, and then a lower-priority signal is transmitted with the remaining power. In this case, if the minimum power is set as the total power of the UE, power may be assigned first to the higher-priority signal.

In an embodiment, the emergency D2D signal (or emergency sidelink signal) may have a higher priority level than any other D2D signal. For example, the emergency D2D signal may have a higher priority level than other general sidelink discovery signal, sidelink control signal (or SA), and sidelink data signal.

Particularly, even when the emergency D2D signal is transmitted in the same form as a discovery signal, the emergency D2D signal may have a higher priority level than a sidelink control signal or a sidelink data signal, compared to other general discovery signals.

Further, transmission of lower-priority D2D signals, particularly UE selection scheme-based D2D signals may be prohibited in resources overlapped with a resource pool assigned to the emergency D2D signal. For example, the UE selection scheme-based discover signals may not be transmitted. This operation is done to prevent interference with transmission of the emergency D2D signal. When needed, an emergency D2D indicator signal may be introduced, and only when the emergency D2D indicator signal is detected, transmission of a normal D2D signal may be prohibited in resources overlapped with an emergency D2D resource pool, as described below.

However, the emergency D2D signal may have a lower priority level than a Sidelink Synchronization Signal (SLSS) transmitted only for the purpose of synchronization or a PSBCH. This is because reception of the SLSS and/or the PSBCH should precede reception of the emergency D2D signal. In this case, the corresponding UE may be prohibited from transmitting the emergency D2D signal in time resources and/or frequency resources in which the SLSS/PSBCH is to be transmitted. However, if a synchronization signal is transmitted separately or a synchronization procedure is performed separately, for the emergency D2D signal, for example, if synchronization is performed using a satellite signal, without an SLSS, the emergency D2D signal may have a higher priority level than the SLSS and/or the PSBCH.

Further, the emergency D2D signal may have a higher priority level than a UL signal. That is, if for the same UE, transmission of the emergency D2D signal is scheduled in resources to which a sidelink signal is allocated and which are wholly or partially overlapped with resources to which a UL signal is allocated, the emergency D2D signal may have priority over the UL signal. For example, if for the same UE, a UL subframe overlaps wholly or partially with a sidelink subframe that will carry the emergency D2D signal, the emergency D2D signal may be transmitted in the sidelink subframe.

Even in this case, the UL signal may have a different relative priority level according to the property of the UL signal. For example, a periodic CSI report or periodic SRS whose transmission is indicated semi-statically, or a semi-persistently scheduled PUSCH transmission has relatively low importance, compared to other UL signals. Therefore, the emergency D2D signal may have priority over these signals.

If the highest priority level is assigned to the emergency D2D signal, the emergency D2D signal may have priority over a UL signal scheduled by a PDCCH.

With extension of the above, it may be assumed that D2D signals have predetermined priority levels, UL signals have predetermined priority levels, and there is a UL signal priority level corresponding to a D2D signal having a specific priority level. In this case, although a D2D signal has a lower priority level than a UL signal having a corresponding or higher priority level, the D2D signal may have a higher priority level than a UL signal having a priority level lower than the corresponding priority level.

Herein, in regards to the priority levels of D2D signals, PSCCH and PSSCH have priority over PSDCH, and different priority levels may be assigned to the PSCCH and the PSSCH according to applications from which messages delivered by the PSCCH and the PSSCH have been generated. For UL signals, a signal whose transmission is indicated semi-statically has a lower priority level than a signal whose transmission is indicated dynamically. Further, different priority levels may be assigned to PUSCHs carrying data according to applications in which messages delivered by the PUSCHs have been generated.

For active eNB scheduling, an eNB may preset the priority level of a UL signal over which a D2D signal having a certain priority level has priority by a higher-layer signal such as an RRC signal. Particularly in the case of a data message, a priority level may be assigned per packet generated from a higher layer in D2D. This is called Per-Packet Priority (PPP). Further, in UL, a specific bearer may be mapped to a specific logical channel, and a priority level may be assigned according to the ID of each logical channel.

In regards to the priority levels of D2D signals and UL signals, the above legacy priority labeling may be applied to data channels. For example, a D2D signal having a specific PPP may be configured to have a higher priority level than a UL signal having a specific logical channel ID, but a lower priority level than UL signals having other logical channel IDs.

Meanwhile, a signal including safety information may be transmitted in a special event-triggered manner or periodically.

However, a signal triggered by a special event and thus generated aperiodically is likely to be more urgent than a periodically transmitted signal. In this case, the emergency D2D signal may be limited to an aperiodically transmitted signal triggered by a special event in the present disclosure.

In the case where the emergency D2D signal has priority over UL signals as described above, if the emergency D2D signal always has a higher priority level than the UL signals, the performance of a PUSCH and a PDSCH may be degraded excessively. Particularly, the PDSCH may perform very poorly due to problems caused by the resulting limitations on HARQ-ACK transmission. According to practical needs, an important, urgent signal should also be transmitted by cellular communication. However, uniform prioritization may make it difficult to satisfy the requirement.

In an embodiment of relieving the afore-described excessive D2D prioritization, a time period may be set, during which the emergency D2D signal has priority over the UL signals. That is, the priority of the emergency D2D signal may be valid within the predetermined time period. Hereinafter, this time period will be referred to as an emergency time period. Preferably, the eNB may set the emergency time period. In this case, since the eNB knows that the emergency D2D signal has priority during the preset time period, the eNB may not schedule a UL signal transmission for a UE likely to transmit the emergency D2D signal in the time period. In the presence of cellular communication requiring transmission with importance, a time period other than the emergency time period may be used. The UL signal may be transmitted with priority over the emergency D2D signal during the time period other than the emergency time period.

The UE may indicate to the eNB whether there is a need for an emergency time period according to the D2D traffic state of the UE or the like. Specifically, the UE may request setting or release of the emergency time period. The UE may also request an increase/decrease in the ratio of the emergency time period. Further, the UE may set and report a time area in which the emergency time period needs to be set. Or the UE may report to the eNB a ratio of a time period used for an actual emergency D2D signal with priority to the emergency time period. Upon receipt of the report, the eNB may control the emergency time period to an appropriate time period for the individual UE.

In another embodiment of relieving the afore-described excessive D2D prioritization, a ratio r of the emergency D2D signal having priority over a UL signal may be set. For example, if the ratio r of the emergency D2D signal having priority within a predetermined time period is X %, this means that the UE may give priority to D2D by X % at maximum in the corresponding time period.

If the emergency D2D signal has priority and a UL signal overlapped with the emergency D2D signal in time is dropped, this means that the ratio of the UL signal dropped by the emergency D2D signal should be equal to or less than X %. That is, if the UE has already dropped X % of the total UL signal due to D2D during a predetermined time period, it means that the UL signal should not be dropped any more within the time period due to D2D.

In defining the ratio r, a dropped UL signal out of a total scheduled UL signal during the time period may be taken. However, the UE has difficulty in determining upcoming UL scheduling. Therefore, the UE may determine whether a UL signal of X % or larger has been deprioritized in a predetermined time period before a transmission time of a specific UL signal. Alternatively, the ratio may be defined on the assumption that a UL signal is transmitted at every time instant. That is, the ratio r may be defined by (the number of TTIs in which an actual UL transmission is deprioritized/the total number of TTIs in a corresponding time period).

Or in another embodiment of relieving the afore-described excessive D2D prioritization, the number of times in which the emergency D2D signal has priority over a UL signal in a specific time period (e.g., 1 ms) or a maximum number of times in which the UL signal is deprioritized may be defined.

The above-described prioritization is applicable to reception as well as transmission. Prioritization of receptions may imply that when it is impossible for one UE to receive two signals at the same time, the UE receives a signal having the higher priority level. For example, it may be assumed that although two signals are transmitted in different frequencies, the UE has not established a reception circuit for receiving the two frequencies at the same time. Further, if the UE has only one reception circuit, the UE may receive the signal with the higher priority by tuning the reception circuit to a carrier of the signal with the higher priority.

The emergency D2D signal may be received with priority over a D2D signal and/or a DL signal which has a lower priority level than that of the emergency D2D signal. Specifically, the receiving UE may receive the emergency D2D signal with priority over a D2D signal having a lower priority level. If the emergency D2D signal has priority over a DL signal, the receiving UE may receive the emergency D2D signal with priority over the DL signal.

Receptions may be prioritized semi-statically. For example, the network may indicate reception priority levels, and accordingly, the receiving UE may receive a carrier likely to carry the emergency D2D signal with priority.

As described later, however, the prioritization may be applied restrictively only when the emergency D2D signal is actually transmitted by specific signaling. In this case, the carrier of the emergency D2D signal may be treated equally with other carriers during a time period in which the emergency D2D signal is not transmitted.

On the other hand, if the receiving UE is not capable of transmitting a signal simultaneously with reception of a signal in a specific carrier, the UE may drop the signal to be transmitted at a time overlapped with the signal with the higher priority level in order to receive the signal with the higher priority level. For example, in the case where the UE is to receive the emergency D2D signal in a specific carrier at a specific time instant, if the UE is configured to transmit a UL signal or a D2D signal at an overlapped time in the specific carrier in which simultaneous transmission and reception is impossible, the UE may receive the emergency D2D signal, while dropping the UL signal or the D2D signal according to the priority levels of the signals.

Now, a description will be given of a method for determining resources for transmission of an emergency D2D signal.

As described before, resources for transmission of a D2D signal are generally determined by the eNB scheduling scheme in which an eNB selects resources to be used for an individual transmitting UE, or the UE selection scheme in which a UE autonomously selects appropriate resources from an eNB-configured resource pool. In general, exchange of resource request and allocation signals between an eNB and a UE is required in the eNB scheduling scheme, which makes the eNB scheduling scheme inappropriate for an emergency D2D signal requiring fast transmission. Accordingly, the following description is given mainly of resource selection based on the UE selection scheme.

First, the emergency D2D signal may use a resource pool separate from a resource pool configured for a D2D signal transmitted in a normal situation other than an emergency. In this case, a UE that wants to transmit a normal D2D signal is prohibited from using a resource pool configured for the emergency D2D signal. In this case, transmission parameters for the corresponding resource pool, for example, a transmission power control parameter and/or a CP length may be determined in consideration of the service quality of the emergency D2D signal.

In another method, the emergency D2D signal may share the resource pool configured for the normal D2D signal. If resources are shared, a transmission parameter for the emergency D2D signal, particularly, a transmission power determining parameter may be indicated separately. In this case, the emergency D2D signal may be transmitted with higher power than the normal D2D signal, so that the quality of the emergency D2D signal may be ensured to a certain degree even in the resource sharing situation. The resource pool sharing scheme is advantageous in that when the emergency D2D signal and the normal D2D signal are transmitted simultaneously in the same time resources and/or frequency resources, there is no need for maintaining a separate resource pool for the emergency D2D signal, thereby increasing total resource efficiency.

Meanwhile, a requirement for the emergency D2D signal is that the emergency D2D signal should be transmitted fast only when an emergency occurs, after not being transmitted for a long time, in view of the nature of the emergency D2D signal. Therefore, if transmission resources for the emergency D2D signal are pre-allocated and maintained all the time, the utilization of the resources is very low. Particularly, when the UE selection scheme is applied, the eNB is not capable of determining whether the emergency D2D signal will be actually transmitted in a resource pool available for the emergency D2D signal, thereby making it difficult to use the resource pool for another purpose such as UL transmission.

This problem may be solved by transmitting a kind of indicator signal before transmission of the emergency D2D signal by the UE. Characteristically, even though different UEs transmit different emergency D2D signals, if the UEs have at least a certain common property, the UEs transmit the same indicator signal in the same preset resources. For example, if the UEs belong to the same cell, transmit the same type of emergency D2D signals, or transmit the emergency D2D signals in the same resource pool, the UEs use the same indicator signal in the same preset resources.

If this indicator signal is used, the eNB monitors whether the indicator signal indicating transmission of an emergency signal is transmitted in predetermined resources. Upon detection of the indicator signal, the eNB may predict that an emergency D2D signal will be transmitted in a following resource pool. Therefore, the eNB may not schedule a UL signal transmission in the resources. Or the eNB may indicate transmission of an emergency D2D signal to other UEs by a PDCCH or the like.

If the eNB indicates transmission of an emergency D2D signal by a PDCCH, UEs receiving the indication may attempt to receive the emergency D2D signal. Particularly, when there is a lack of reception circuits available for reception of the emergency D2D signal due to reception of a DL signal or D2D signal in another carrier, part of the reception may be discontinued and the emergency D2D signal may be received instead. In this case, regarding reception discontinuation prioritization, it may be regulated that D2D signal reception is first discontinued, if D2D signal reception cannot be discontinued, SCell reception is discontinued, and if SCell reception cannot be discontinued, PCell reception is discontinued.

The PDCCH may be transmitted in a common search space so that a plurality of UE may monitor the PDCCH. To distinguish the PDCCH with a legacy PDCCH, the CRC of the PDCCH may be masked by a separate RNTI.

Figure 19:
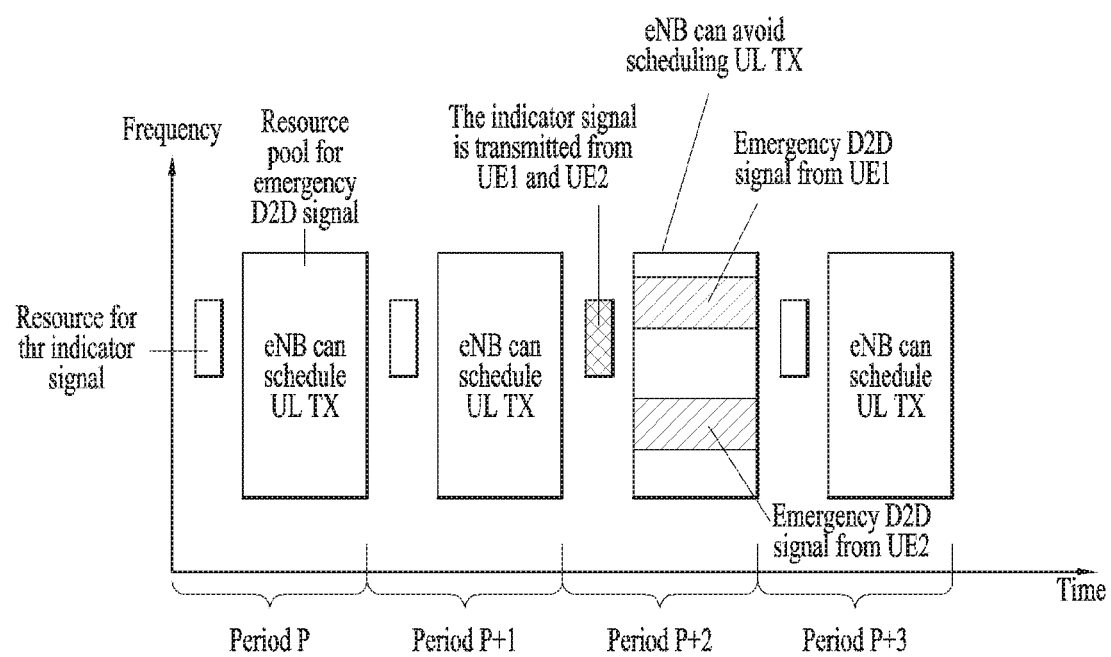
FIG. 19 is a view illustrating a method for transmitting a sidelink signal in an emergency situation according to an embodiment of the present disclosure.

FIG. 19 is a view illustrating an example of using the afore-described indicator signal for an emergency D2D signal. Referring to FIG. 19, it is assumed that in a situation where transmission resources for an indicator signal and an emergency D2D resource pool corresponding to the indicator signal are repeated in every predetermined period, no emergency D2D signal transmission occurs in period P and period P+1, and an emergency D2D signal transmission occurs in period P+2. In this case, after UE1 and UE2 transmit indicator signals simultaneously, UE1 and UE2 select different resources and transmit emergency D2D signals in the selected resources. Therefore, upon detection of the indicator signals in period P+2, the eNB does not perform UL scheduling for the emergency D2D signal resource pool in the corresponding period. No emergency D2D signal is transmitted in period P+3.

An SLSS and/or a PSBCH may be used as an exemplary indicator signal for an emergency D2D signal, applicable to the present disclosure. In this case, other UEs may acquire time synchronization and frequency synchronization by first detecting the signal, and thus receive a following emergency D2D signal. To distinguish the SLSS and/or the PSBCH serving the purpose of indication from an SLSS and/or a PSBCH serving for transmission and reception synchronization of a normal D2D signal, the eNB may assign a separate synchronization ID to the corresponding indicator signal. Or this indicator signal may use, as a synchronization ID, a number outside a range configured for the general SLSS and/or PSBCH, or a different SLSS sequence.

Another example of an indicator signal for an emergency D2D signal, applicable to the present disclosure may be a preset PRACH preamble. The eNB may configure a specific PRACH preamble for the usage of an indicator signal, and use the preamble as the indicator signal in specific resources.

Another example of an indicator signal for an emergency D2D signal, applicable to the present disclosure may be a specific type of SA. A specific field, DM-RS, scrambling sequence, and/or CRC of an SA may be set to a predetermined value. In this case, a UE which has performed a general SA detection procedure may discover the indicator signal. To protect transmission of an SA serving the purpose of indication, SA resources prohibited for an SA serving a general usage may be used as indicator signal resources. In this case, a resource pool carrying an emergency D2D signal may be linked to resources for an SA transmitted as an indicator signal.

Another example of an indicator signal for an emergency D2D signal, applicable to the present disclosure may be a specific type of discovery message. A specific field, DM-RS, scrambling sequence, and/or CRC of a discovery message may be set to a predetermined value. In this case, a UE which has performed a general discovery detection procedure may discover the indicator signal. To protect transmission of a discovery message serving the purpose of indication, SA resources prohibited for a discovery signal serving a general usage may be used as indicator signal resources. In this case, a resource pool carrying an emergency D2D signal may use a different subframe in the same period of the same resource pool as the discovery message transmitted as an indicator signal. In this case, the UE may be required to transmit a discovery message at least twice within one discovery period (PDSCH period). That is, the UE may transmit an indicator signal and an emergency D2D signal within the corresponding period.

If a plurality of UEs transmit emergency D2D signals, indicator signals for the emergency D2D signals are not necessarily limited to the same signal type in the above principle. The indicator signals may be different signals that the UEs transmit in different resources.

In this case, the indicator signals for the emergency D2D signals may also be distinguished from a normal D2D signal according to the foregoing methods. For example, an indicator signal for an emergency D2D signal may be transmitted in a separate resource pool, and include an indicator indicating that this signal is an indicator signal for an emergency D2D signal. Particularly when the indicator signal for the emergency D2D signal is transmitted in the form of an SA, the SA may be distinguished from an SA for a normal D2D signal, in terms of resource pool and/or signal type. However, as described before, a resource pool carrying actual data may be shared.

According to the foregoing embodiments of the present disclosure, an emergency D2D signal including safety information may be transmitted and received with priority over a normal signal. Accordingly, information about an emergency may be efficiently transmitted and received.

5. Apparatuses

Figure 20:
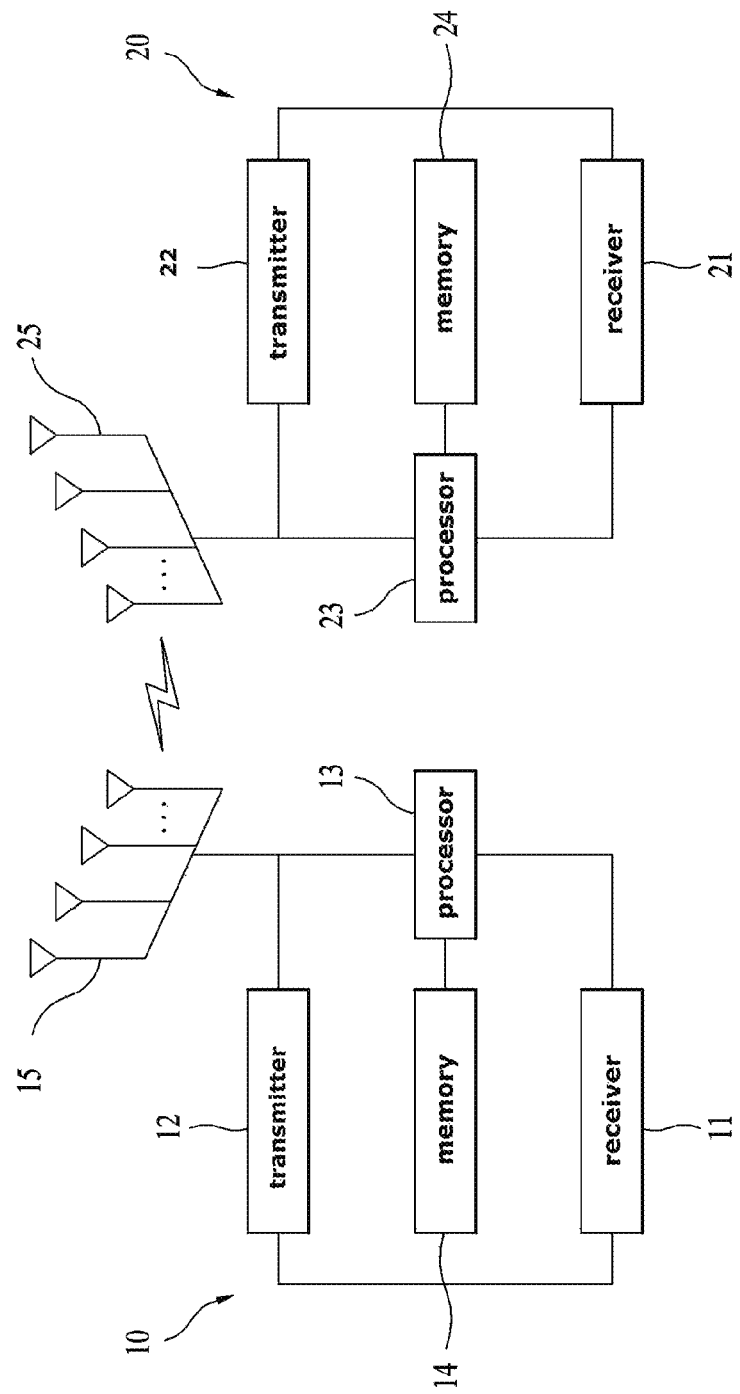
FIG. 20 is a block diagram of apparatuses for implementing the methods illustrated in FIGS. 1 to 19.

The apparatuses described with reference to FIG. 20 are means for implementing the methods illustrated in FIGS. 1 to 19.

A UE may operate as a transmitter on UL and as a receiver on DL. An eNB may operate as a receiver on UL and as a transmitter on DL. Further, the eNB may be a terminal that performs D2D communication or sidelink transmission and reception in FIG. 20. In this case, each UE may operate as a transmitter and a receiver on a sidelink.

That is, each of the UE and the eNB may include a Transmitter (Tx) 12 or 22 and a Receiver (Rx) 11 or 21, for controlling transmission and reception of information, data, and/or messages, and an antenna 15 or 25 for transmitting and receiving information, data, and/or messages.

Each of the UE and the eNB may further include a processor 13 or 23 for implementing the afore-described embodiments of the present disclosure and a memory 14 or 24 for temporarily or permanently storing operations of the processor 13 or 23.

The embodiments of the present disclosure may be performed by use of the components and functions of the above-described UE and eNB. For example, if resources for one or more signals are configured in specific resources, the UE may transmit a signal to another UE or an eNB according to predetermined prioritization. If the UE is a receiver and resources for one or more signals are configured in specific resources, the UE may receive a signal from another UE or an eNB according to predetermined prioritization.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3280 or 3290 and executed by the processor 3220 or 3230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for transmitting a signal by a user equipment (UE) in a wireless communication system, the method comprising:

receiving prioritization related radio resource control (RRC) information used to determine whether transmission of a sidelink signal is prioritized over transmission of an uplink signal;

determining whether the transmission of the sidelink signal is prioritized over the transmission of the uplink signal based on a priority value of a logical channel of the sidelink signal, a priority value of a logical channel of the uplink signal and the prioritization related RRC information; and based on the UE not being capable of simultaneous transmitting both the sidelink signal and the uplink signal, transmitting the sidelink signal or the uplink signal with a higher priority based on the determining.

2. The method according to claim 1, based on the UE being capable of simultaneous transmitting both the sidelink signal and the uplink signal and based on the total transmission power of the sidelink signal and the uplink signal exceeding a maximum transmission power of the UE, reducing a transmission power of the sidelink signal or the uplink signal with a lower priority based on the determining so that the total transmission power does not exceed the maximum transmission power of the UE.

3. A user equipment (UE) for transmitting a signal in a wireless communication system, the UE comprising:

a transceiver;

a processor operably connected to the transceiver, the processor configured to:

receive prioritization related radio resource control (RRC) information used to determine whether transmission of a sidelink signal is prioritized over transmission of an uplink signal;

determine whether the transmission of the sidelink signal is prioritized over the transmission of the uplink signal based on a priority value of a logical channel of the sidelink signal, a priority value of a logical channel of the uplink signal, and the prioritization related RRC information; and based on the UE not being capable of simultaneous transmitting both the sidelink signal and the uplink signal, transmit the sidelink signal or the uplink signal with a higher priority based on the determining.

4. The UE according to claim 3, the processor further configured to:

based on the UE being capable of simultaneous transmitting both the sidelink signal and the uplink signal and based on the total transmission power of the sidelink signal and the uplink signal exceeding a maximum transmission power of the UE, reduce a transmission power of the sidelink signal or the uplink signal with a lower priority based on the determining so that the total transmission power does not exceed the maximum transmission power of the UE.

* * * * *